(12) United States Patent
Statham et al.

(10) Patent No.: US 11,567,740 B2
(45) Date of Patent: Jan. 31, 2023

(54) TECHNIQUES FOR BUILDING AND OPTIMIZING CONTACT SERVICE CENTERS

(71) Applicant: Oracle International Corporation, Redwood Shores, CA (US)

(72) Inventors: Steven Statham, Monument, CO (US); Neelima Kalagara, Concord, NH (US); Nagaratna Hegde, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/174,234

(22) Filed: Feb. 11, 2021

(65) Prior Publication Data
US 2022/0253291 A1    Aug. 11, 2022

(51) Int. Cl.
*G06F 8/36* (2018.01)
*G06F 8/41* (2018.01)
*G06F 8/60* (2018.01)
*G06F 8/30* (2018.01)
*G06F 11/36* (2006.01)
*H04M 3/51* (2006.01)
*H04M 3/42* (2006.01)

(52) U.S. Cl.
CPC ............... *G06F 8/36* (2013.01); *G06F 8/315* (2013.01); *G06F 8/44* (2013.01); *G06F 8/60* (2013.01); *G06F 11/3688* (2013.01); *H04M 3/42136* (2013.01); *H04M 3/51* (2013.01)

(58) Field of Classification Search
None
See application file for complete search history.

(56) References Cited

U.S. PATENT DOCUMENTS

| | | | |
|---|---|---|---|
| 9,887,876 B2 * | 2/2018 | Kumar | H04L 41/20 |
| 2018/0136931 A1 * | 5/2018 | Hendrich | G06F 11/30 |
| 2019/0102157 A1 * | 4/2019 | Caldato | G06F 9/547 |
| 2020/0310888 A1 * | 10/2020 | Gopalan | G06F 9/54 |
| 2021/0065123 A1 * | 3/2021 | Halty | G06Q 10/06313 |
| 2021/0124576 A1 * | 4/2021 | Gungabeesoon | G06F 8/38 |
| 2021/0263735 A1 * | 8/2021 | Harishankar | G06F 8/76 |
| 2021/0385332 A1 * | 12/2021 | Edamadaka | H04L 67/55 |
| 2022/0004448 A1 * | 1/2022 | Chen | G06N 5/04 |

FOREIGN PATENT DOCUMENTS

CN     111522738 A    *    9/2020    .......... G06F 11/3688

OTHER PUBLICATIONS

Messerschmitt, "Software Supply Industry", 2005, Book published by MIT Press (Year: 2005).*

* cited by examiner

*Primary Examiner* — Hossain M Morshed
(74) *Attorney, Agent, or Firm* — Kilpatrick Townsend & Stockton LLP

(57) ABSTRACT

In some implementations, a computing device may receive a selection of one or more contact center features, the contact center features associated with one or more micro services configured to execute the one or more contact center features. The computing device may select a model from a plurality of stored models based at least in part on the selection of the one or more contact center features, the selected model comprising programmable code configured to execute the one or more micro services. The computing device may provision the selected model to execute the one or more micro services. The computing device may generate executable code from the provisioned model using an automation server for deployment to one or more servers.

20 Claims, 18 Drawing Sheets

US 11,567,740 B2

TECHNIQUES FOR BUILDING AND OPTIMIZING CONTACT SERVICE CENTERS

BACKGROUND

Contact centers can be an integrated and automated communications systems that coordinate telephone and electronic communications between an organization and the public. Many businesses use contact centers to fully or partially automate communications between customers and the business. While some software for contact centers exists, the functionality is limited and often leads to the monolithic development of contact center systems, which consume time from developers, diminish quality assurance, and are inefficient with regards to support and product management for onboarding customers.

BRIEF SUMMARY

This disclosure describes techniques for a system and techniques for creating reusable components that can be integrated on top of vendor software that can be automatically configured and deployed to customers. These techniques will apply software development and operations (DevOps) processes improve the speed and reliability of contact center technologies. This solution allows for the creation of encapsulated micro service components to be created, integrated into defined flows, and provision for customers using data driven approach. This idea integrates seamlessly with technologies like contact center, cloud, Java, and DevOps, embracing a "customer first" mentality using true DevOps models with end-to-end automation. This architecture is designed to be a layer on top of traditional contact center vendor offerings and is meant to drive significant improvement in terms of initial quality, usability of components, time-to-market and flexibility. This solution will allow quantifiable improvement for developers to focus on creating new and updated micro services along with connecting these services into new and unique workflows while allowing product managers and service delivery teams to focus on provisioning of developed solutions and therefore drive value to the business of variously increased pace.

The techniques create an abstraction layer on top of vendor software. This allows for the creation of selectable features for a contact center system. A call menu can be an example of one of the selectable features.

In some aspects, a method includes: receiving, by a computing device, a selection of one or more contact center features, the contact center features associated with one or more micro services configured to execute the one or more contact center features; selecting, by the computing device, a model from a plurality of stored models based at least in part on the selection of the one or more contact center features, the selected model comprising programmable code configured to execute the one or more micro services; provisioning, by the computing device, the selected model to execute the one or more micro services; and generating, by the computing device, executable code from the provisioned model using an automation server for deployment to one or more servers.

In some aspects, the method includes receiving one or more inputs for a customized flow that provides an order for executing the one or more contact center features.

In some aspects, the one or more micro services comprise respective web services.

In some aspects, the method includes testing an ability of the selected model to execute the one or more micro services.

In some aspects, at least some of the contact center features comprise different contact center features versions from the other contact center features.

In some aspects, each of the one or more contact center features comprises a front-end component and a back end component, the front-end component uses a markup language that is both human-readable and machine-readable.

In some aspects, the back end component uses an object-oriented programming language.

In some aspects, a non-transitory computer-readable medium storing a set of instructions includes: one or more instructions that, when executed by one or more processors of a computing device, cause the computing device to perform operations comprising: receive a selection of one or more contact center features, the contact center features associated with one or more micro services configured to execute the one or more contact center features; select a model from a plurality of stored models based at least in part on the selection of the one or more contact center features, the selected model comprising programmable code configured to execute the one or more micro services; provision the selected model to execute the one or more micro services; and generate executable code from the provisioned model using an automation server for deployment to one or more servers.

In some aspects, the one or more instructions further cause the computing device to receive one or more inputs for a customized flow that provides an order for executing the one or more contact center features.

In some aspects, the one or more micro services comprise respective web services.

In some aspects, the one or more instructions further cause the computing device to test an ability of the selected model to execute the one or more micro services.

In some aspects, at least some of the contact center features comprise different contact center features versions from the other contact center features.

In some aspects, each of the one or more contact center features comprises a front-end component and a back end component, the front-end component uses a markup language that is both human-readable and machine-readable.

In some aspects, the back end component uses an object-oriented programming language.

In some aspects, a computing device includes: one or more memories; and one or more processors, communicatively coupled to the one or more memories, configured to perform operations comprising: receive a selection of one or more contact center features, the contact center features associated with one or more micro services configured to execute the one or more contact center features; select a model from a plurality of stored models based at least in part on the selection of the one or more contact center features, the selected model comprising programmable code configured to execute the one or more micro services; provision the selected model to execute the one or more micro services; and generate executable code from the provisioned model using an automation server for deployment to one or more servers.

In some aspects, the one or more processors are further configured to receive one or more inputs for a customized flow that provides an order for executing the one or more contact center features.

In some aspects, the one or more micro services comprise respective web services.

In some aspects, the one or more processors are further configured to test an ability of the selected model to execute the one or more micro services.

In some aspects, at least some of the contact center features comprise different contact center features versions from the other contact center features.

In some aspects, each of the one or more contact center features comprises a front-end component and a back end component, the front-end component uses a markup language that is both human-readable and machine-readable.

In at least one embodiment, a computing device may receive a selection of one or more contact center features, the contact center features associated with one or more micro services configured to execute the one or more contact center features. The computing device may comprise select a model from a plurality of stored models based at least in part on the selection of the one or more contact center features, the selected model comprising programmable code configured to execute the one or more micro services. The computing device may comprise provision the selected model to execute the one or more micro services. The computing device may comprise generate executable code from the provisioned model using an automation server for deployment to one or more servers.

Reference to the remaining portions of the specification, including the drawings and claims, will realize other features and advantages of disclosed embodiments. Further features and advantages, as well as the structure and operation of various examples of the present disclosure, are described in detail below with respect to the accompanying drawings. In the drawings, like reference numbers can indicate identical or functionally similar elements.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

DETAILED DESCRIPTION

Figure 1:
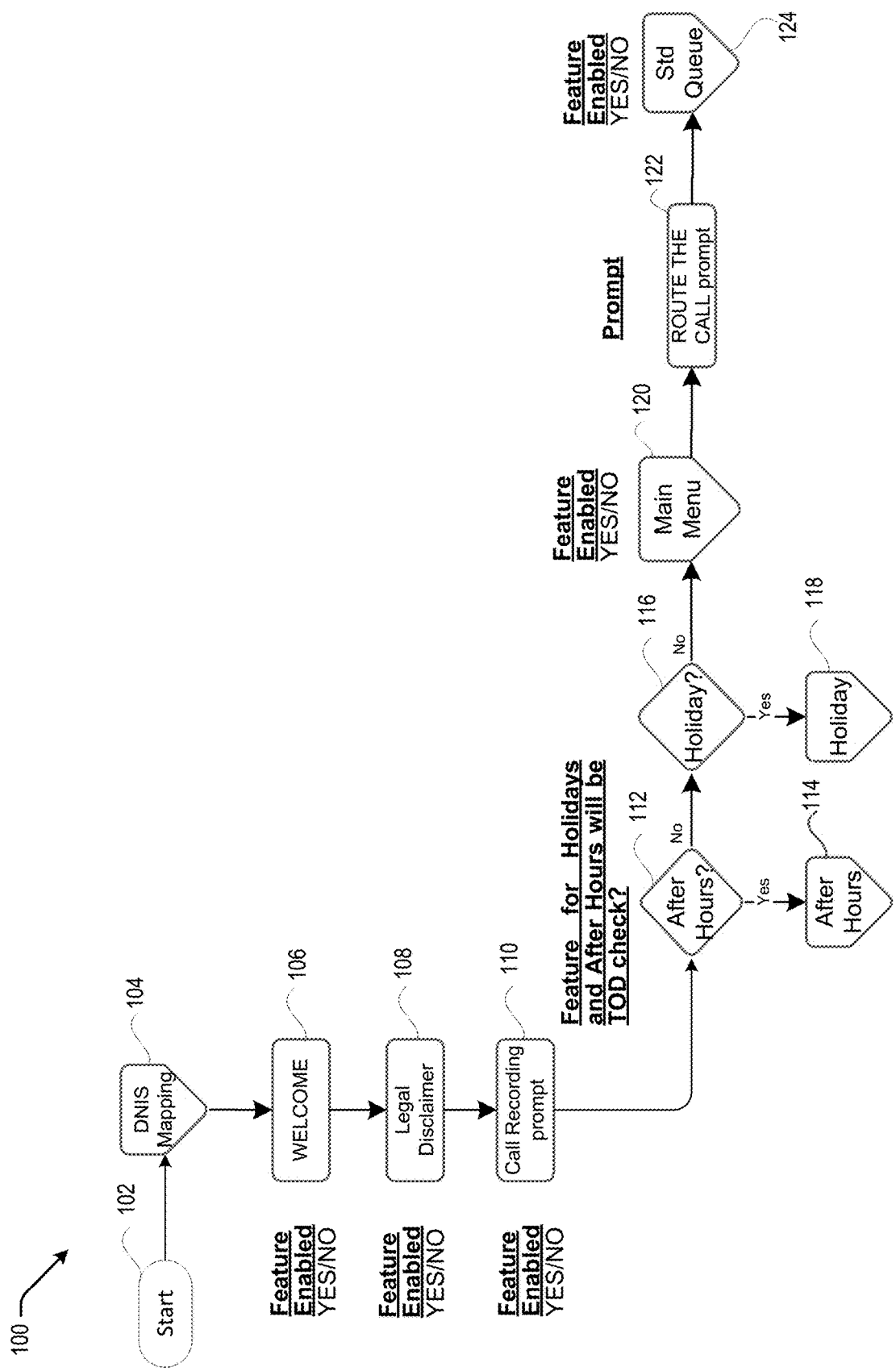
FIG. 1 illustrates an example call flow diagram for an interactive voice response system.

Prior contact center software has been dependent upon vendor low-level building blocks within propriety integrated development environments that are tightly coupled and are not conducive to agile development approaches. This development approach makes it difficult to create reusable services and to create data driven implementation with automation. Some vendors allow for customization of their user interface, but this customization is limited because it requires the use of proprietary tools. For example, using commercially available contact center tools (e.g., Genesys), the tool generates state chart extensible markup language (SCXML) or voice extensible markup language (VXML) code that runs on the proprietary contact center software. The techniques described herein resolve these key problems by isolating and encapsulating the vendor specific integrated development environment generated code (e.g., extensible markup language (XML) or SCXML), which are industry standards for interactive voice response (IVR)/routing applications and aligns completely with an agile development approach using the same kind of automation used for traditional development projects without the need for vendor specific provisioning tools. Further, because of the layered approach that sits above the vendor provided solution the vendor specifics are hidden within the code (e.g., SCXML/VXML/customer web services) and therefore hold the potential to be portable between vendor environments by replacing vendor specific elements. This problem is magnified because each vendor tends to use their own different proprietary code and work needs to be duplicated to carry changes across various systems. The process can be slow and needs to be retested after modifications.

This disclosure describes techniques for a system and techniques for creating reusable components (e.g., micro services) that can be integrated on top of vendor software and can be automatically configured and deployed to customers. These techniques will apply software DevOps processes to improve the speed and reliability of contact center technologies. This solution allows for the creation of encapsulated micro service components to be created, integrated into defined flows, and provision for customers using data driven approach. This idea integrates seamlessly with technologies like contact center, cloud, Java, and DevOps, embracing a "customer first" mentality using true DevOps models with end-to-end automation. This architecture is designed to be a layer on top of traditional contact center vendor offerings and is meant to drive significant improvement in terms of initial quality, usability of components, time-to-market and flexibility. This solution will allow quantifiable improvement for developers to focus on creating new and updated micro services along with connecting these services into new and unique workflows while allowing product managers and service delivery teams to focus on provisioning of developed solutions and therefore drive value to the business of variously increased pace.

FIG. 1 illustrates an example call flow 100 for an IVR system. The flow 100 illustrates an example series of steps that may occur when a caller dials into an IVR system.

Not all the steps described in FIG. 1 need to be performed, nor do the steps need to be performed in the order described.

At 102, the call flow 100 can begin with a user dialing a telephone number associated with an IVR system. In some examples, the IVR system has one dial in number. In some examples, the IVR system can include multiple telephone numbers that route calls into the system.

The call flow 100 can include Dialed Number Identification Service (DNIS) mapping 104. DNIS information can be used for call routing to internal destinations or activation of special call handling. For DNIS service, the telephone company can send a sequence of typically four to ten digits during call setup.

Contact centers, which often have multiple lines coming in, are large consumers of dialed number Identification service (DNIS) services. The need for multiple lines is driven by business requirements. For example, insurance companies can have different numbers to call for sales, service, and claims, but they all end up at the same contact center.

The company may want to play different greetings for the three numbers, offer different IVR menu options, and route the calls to three different agent groups. Using different dialed number Identification services is also a way to measure the success of marketing efforts. For example, if a company runs infomercials on different TV stations and at different times of day, they could use unique 800 numbers for each of the ads. Then, on the back end, the marketing team can conduct analysis, based on DNIS information, to determine which of the ads drove the most calls and had the highest conversion rates. This allows businesses to maximize the effectiveness of their marketing spend.

At 106, the IVR system may play a recorded greeting that identifies the name of the company or the name of the service line. As with many features identified in FIG. 1, this feature may be enabled or disabled by the client.

At 108, the IVR system may place a legal disclaimer. The legal disclaimer may notify the caller that the call may be recorded. An example of a legal disclaimer can include "This call may be recorded for quality and training purposes." Other legal disclaimers can be used depending on the nature of the IVR system. This feature may be enabled or disabled by the client.

At 110, the IVR system may provide a call recording prompt. For example, the call recording prompt may ask a caller to press a number for selecting a language for the call. This feature may be enabled or disabled by the client.

At 112, if the call is received after normal business hours, an after-hours greeting 114 may be played.

At 116, if the call is received during weekend or holiday, a weekend/or holiday greeting 118 may be played.

At 120, the IVR system may provide a menu of options that the caller can select from. The caller may be able to select an option using a voice response or by selecting a number on the phone keypad. This feature may be enabled or disabled by the client.

At 122, the IVR system may route the call to an agent or queue based at least in part on the response or non-response to the prompt. For example, if the main menu indicates "Press or Say one for billing."

At 124, the IVR system may route the call into a queue until the call can be answered by an agent. This feature may be enabled or disabled by the client.

Figure 2:
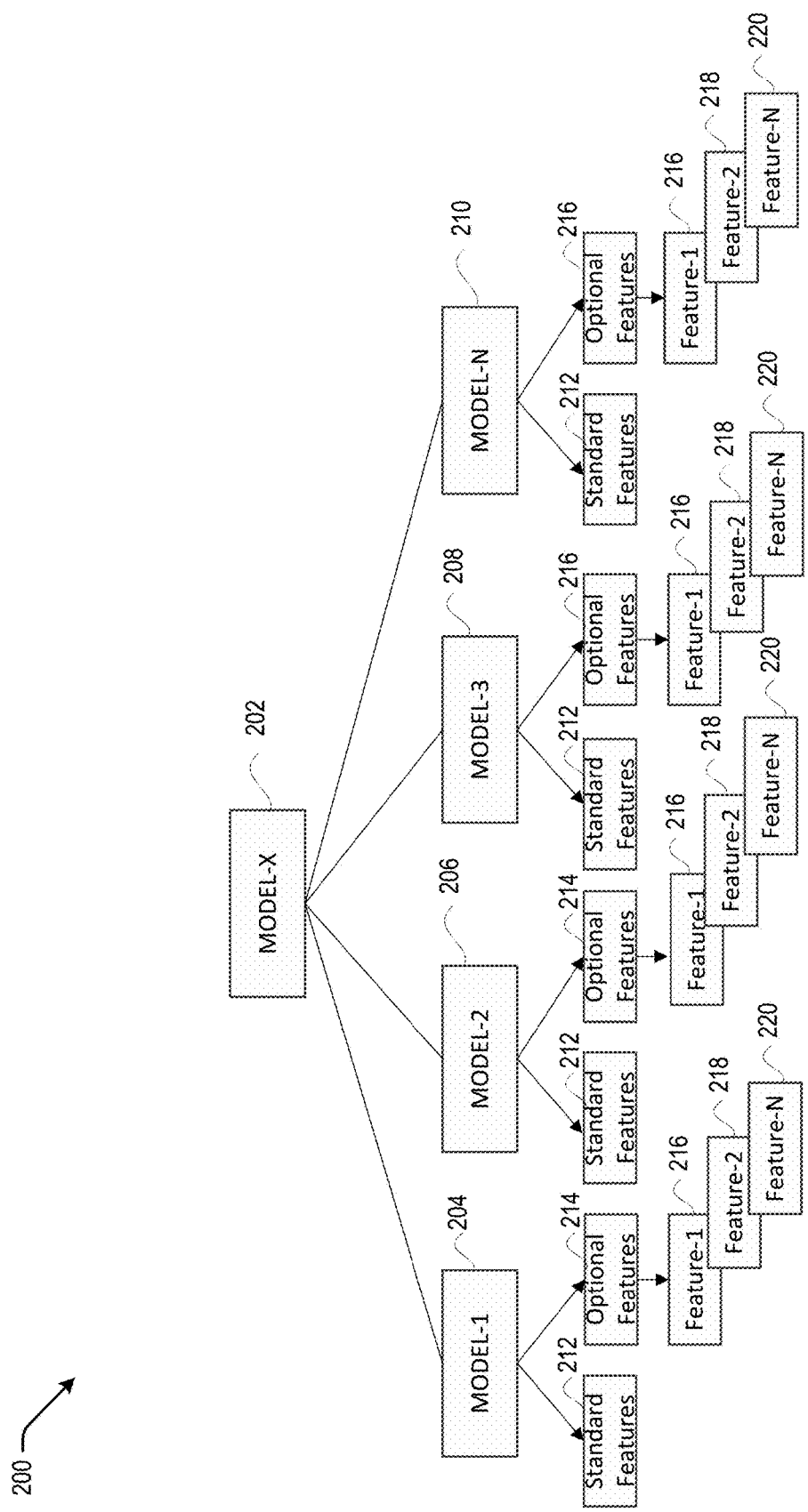
FIG. 2 illustrates an example of a model structure for optimizing contact centers.

FIG. 2 illustrates an example of a model structure 200 for optimizing contact centers. The disclosed model allows for the creation of encapsulated micro service components to be created, integrated into defined flows, and provisioned for customers using a data-driven approach. This idea integrates seamlessly with technologies like contact center, Cloud, Java, and DevOps, embracing a "customer first" mentality by using true DevOps models with end-to-end automation. This architecture is designed to be a layer on top of traditional contact center vendor offerings and is meant to drive significant improvements in terms of initial quality, reusability of components, time to market and flexibility. This solution will allow quantifiable improvement for developers to focus on creating new and updated micro services along with connecting those services into new and unique work flows while allowing product managers and service delivery teams to focus on provisioning of developed solutions and thereby drive value to the business at a vastly increased pace.

In FIG. 2, a client may select a desired model 202 from one of a number of models (e.g., Model-1 204, Model-2 206, Model-3 208 or Model-N 210). As models are developed for some clients they can be stored for selection by new or other existing clients. Each model can include standard features 212. Each model can also include one or more optional features 214 (e.g., Feature-1 216, Feature-2 218, and Feature-N 220).

Each Model can have predefined flow where features can be enabled/disabled. The order of features can remain the same at Model Level. When feature sequence changes in a Model, then it becomes new Model. All of features at Model level can be enabled. If new feature is introduced, then it can be included in new Model. Model-1 can include a base version of all features. New Models can be launched with latest version of each feature. Test mode feature can be enabled for each Model. Models can have multiple versions for bug/patch fixes or for enhancement of existing feature (e.g., when feature version changes, so new model v1.x will be created and pointed to new version of feature).

Figure 3:
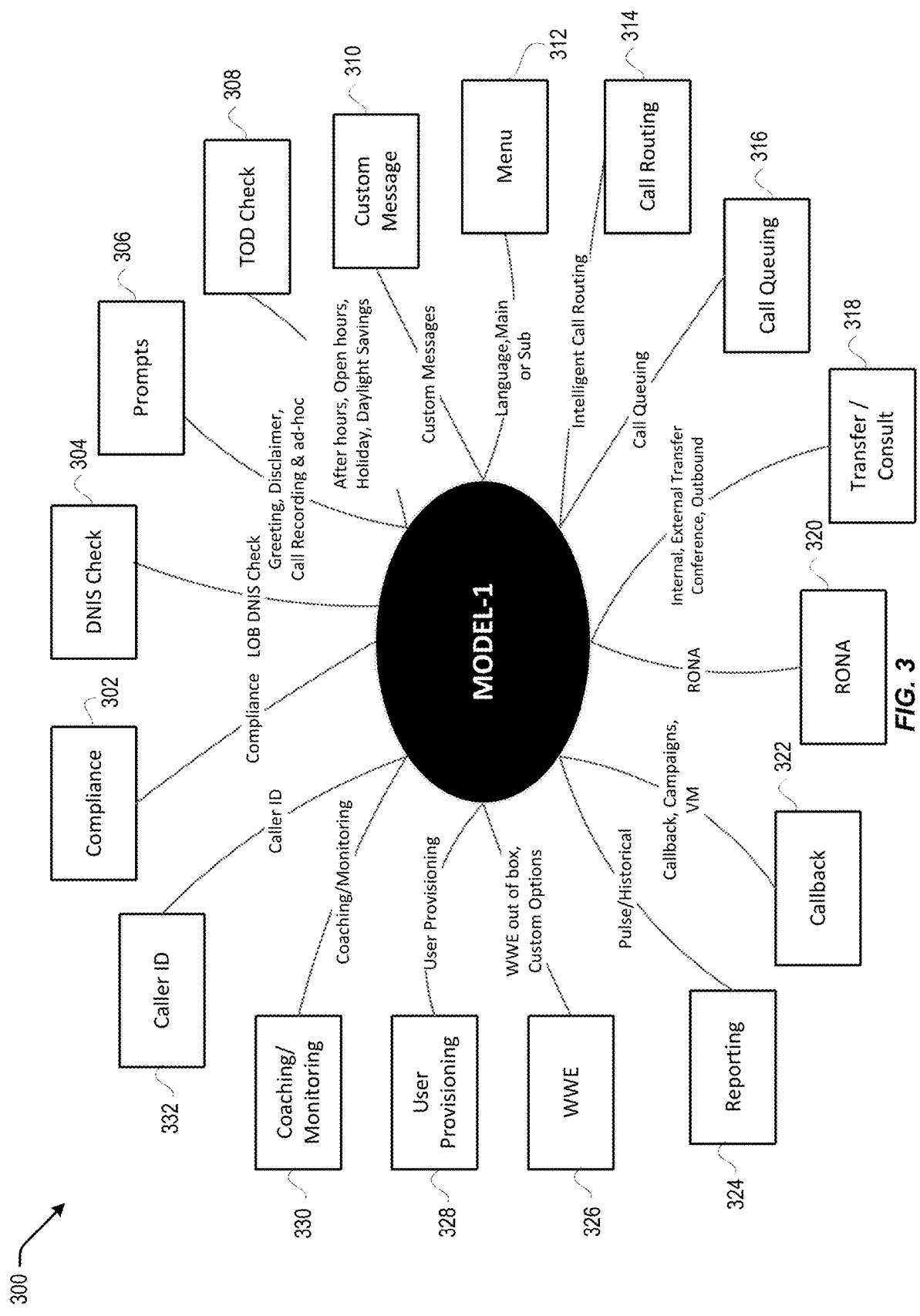
FIG. 3 illustrates an example of model features for an interactive contact center.

FIG. 3 illustrates an example of a model 300 including various features for an interactive contact center. Each feature needs to be developed & tested individually. Micro services need to be built for each feature. The IVR features can be developed independently or combined based on nature of feature. Each feature can allow versioning, in addition each combination of features can be versioned. Some features can be designated as mandatory and cannot be turned off at a line of business (LOB) level. Other features can be turned ON/OFF at provisioning time according to the LOB. Each feature can allow options which can be configured at provisioning time.

FIG. 3 illustrates one or more features for the model 300. The model 300 can include a compliance feature 302. One or more features of the IVR system may trigger compliance requirements with federal, state, or local regulations. For example, the IVR system may allow customers to make electronic payments via a credit or debit card. The Payment Card Industry Data Security Standard (PCI DSS) is a set of requirements intended to ensure that all companies that process, store, or transmit credit card information maintain a secure environment. PCI DSS was launched to manage PCI security standards and improve account security throughout the transaction process. An independent body created by Visa, MasterCard, American Express, and Discover, the PCI Security Standards Council (PCI SSC) administers and manages the PCI DSS. The compliance feature 302 can provide micro services to ensure compliance which the various applicable standards based on the type of model.

In various examples, the model 300 can include a DNIS check feature 304. The DNIS check feature 304 can check the determined number of the caller against one or more stored listed of known numbers. For example, a number may be known to originate from a fraudulent or malicious entity and can be blocked or disconnected from the IVR system.

In various examples, the model 300 can include various prompt features 306. The prompt features 306 can include greeting, language selection, call recording notification and various ad hoc prompts.

In various examples, the model 300 can include a time of day (TOD) check feature 308. The TOD check feature 308 can determine a time, day, date, and/or day of the week of the incoming call. The TOD check feature 308 can be used to determine an appropriate menu, or message to play to the incoming call. The messages can vary outside of normal business hours, during holiday, and can change based on changed in daylight savings time.

In various examples, the model 300 can include a custom message feature 310. The custom message feature can allow clients to record custom messages for the interactive voice message system. The custom message feature 310 can allow a client to select between one or more recorded message to play to a caller.

In various examples, the model 300 can include a menu feature 312. The menu feature 312 can allow a client to customize the IVR menu. The menu feature 312 can allow customization of the main menu and various sub-menus. The menu feature 312 can allow a client to customize In various examples, the model 300 can include a call routing feature 314. The call routing feature 314 can intelligently route incoming call to the most suitable agent, instead of simply choosing the next available agent. The call routing feature 314 can request information from the caller and interpret the caller's voice or keypad response to determine the purpose of the call. The call routing feature 314 can route the call to an agent best suited to address the identified purpose.

In various examples, the model 300 can include a call queuing feature 316. Call queues are the lines that callers are placed in after they have been routed through the IVR system. A call queue can lines up to a specific ring group.

In various examples, the model 300 can include a transfer/consult feature 318. The transfer/consult feature 318 can allow the incoming call to be transferred internal to the contact center, external to the contact center, or to a conference call. The transfer/consult feature 318 can allow the incoming call to be transferred from one agent to another, an agent to a supervisor, or a supervisor back to an agent.

In various examples, the model 300 can include a redirection on no answer (RONA) feature 320. The IVR can detect when a caller does not response to questions or prompts for the system. The RONA feature 320 can prompt a caller to respond. The RONA feature 320 can also be used for unavailable responses (e.g., a menu prompts options 1-5 and a caller selects the number 7). The RONA feature 320 can play a pre-recorded message. The RONA feature 320 can disconnect the call after the pre-recorded message is played or within a predetermined period of time after the prompt to respond and no response is received.

In various examples, the model 300 can include a callback feature 322. In some instances, caller queues can become long and the callback feature 322 allows a caller to retain their place in line and receive a call back when they are up in queue. The callback feature 322 can utilize the Caller ID feature 332 to determine the caller's telephone number.

In various examples, the model 300 can include a reporting feature 324. The reporting feature 324 can count various metrics regarding the incoming calls (e.g., number of calls, number of calls for each prompt, caller waiting time, etc.) The metrics can be used by the client to staff and manage the contact center.

In various examples, the model 300 can include a Workspace Web Edition (WWE) feature 326 that can be an agent desktop where customer service representatives can log in to accept/answer a call and help users with their queries. The WWE feature 326 allows for custom options for access to the IVR system throughout the world.

In various examples, the model 300 can include a user-provisioning feature 328. The user-provisioning feature 328 allows clients to customize the IVR system. The provisioning feature 328 allows a client to select one or more features. The one or more features can be provisioned On or Off. The one or more features can be provisioned for In various examples, the model 300 can include a coaching/monitoring feature 330. The coaching/monitoring feature 330 can assist a caller through use of intelligent agents. The intelligent agents may answer the caller's questions or assist the caller in reaching the most suitable agent to assist the caller.

In various examples, the model 300 can include a Caller identification (ID) feature 332. The caller ID feature 332 can determine the telephone number of the incoming call.

Figure 4:
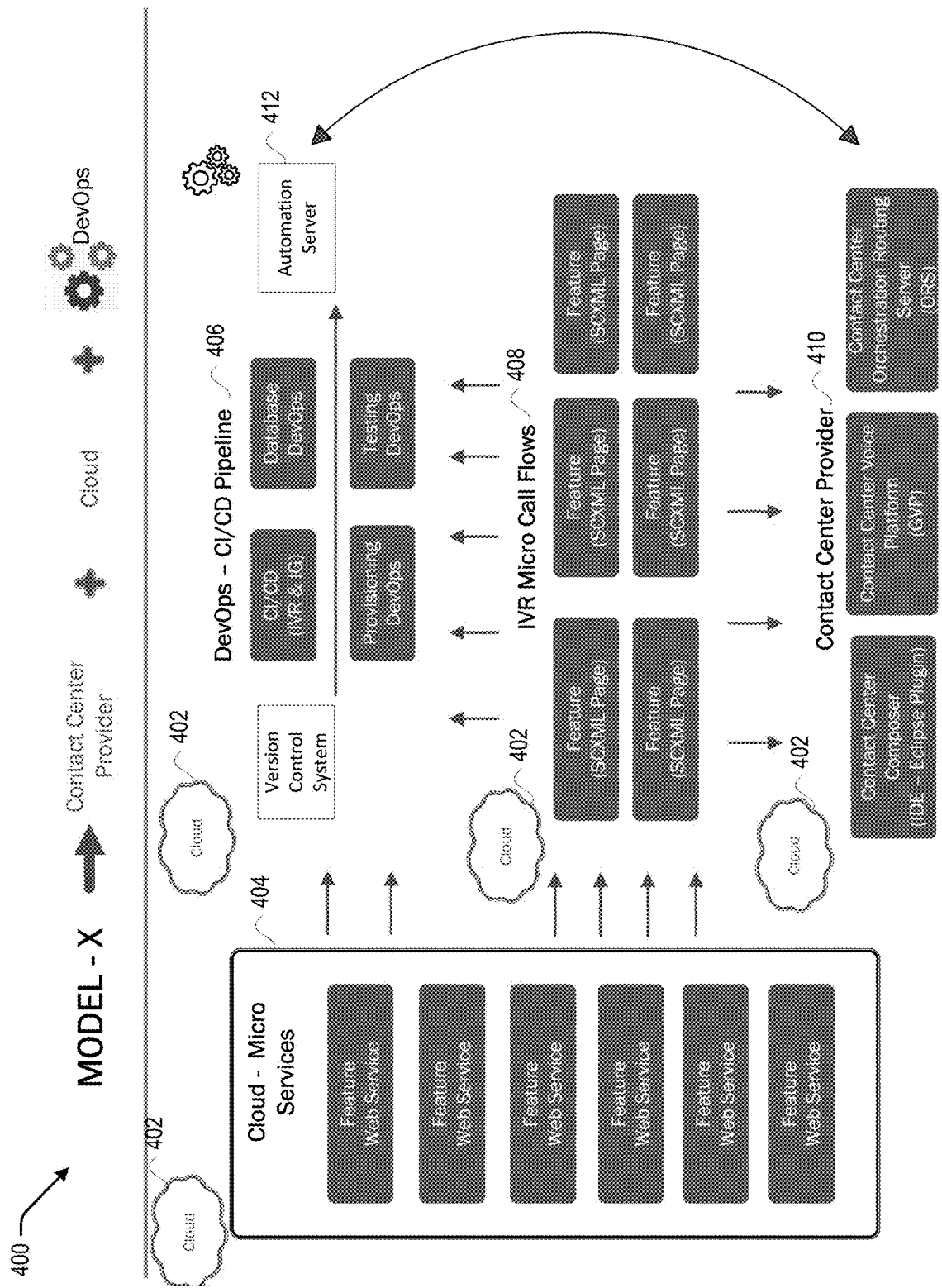
FIG. 4 illustrates an example high-level component diagram for an interactive contact center model.

FIG. 4 illustrates an example high-level component diagram 400 for an interactive contact center model. The storage system (e.g., a cloud storage server 402) can store one or more micro services 404. The micro services 404 can provide the functionality for the one or more features described in FIG. 3. Commercially available deployment tools 412 can include Jenkins, Travis CI, GitLab, Go continuous delivery, Team City, Buildbot, and Bamboo.

The model illustrated in FIG. 4 can also include Development/Operations continuous integration (CI) continuous deployment (CD) pipeline 406. DevOps is a set of practices that combines software development (Dev) and IT operations (Ops). DevOps aims to shorten the systems development life cycle and provide continuous delivery with high software quality. CI/CD bridges the gaps between development and operation activities and teams by enforcing automation in building, testing and deployment of applications. Modern day DevOps practices involve continuous development, continuous testing, continuous integration, continuous deployment and continuous monitoring of software applications throughout its development life cycle. The CI/CD practice or CI/CD pipeline forms the backbone of modern day DevOps operations. The DevOps CI/CD pipeline 406 can include pipelines for the IVR system. A pipeline consists of a chain of processing elements (processes, threads, co-routines, functions, etc.), arranged so that the output of each element is the input of the next; the name is by analogy to a physical pipeline. The DevOps CI/CD pipeline 406 can include a DevOps database that stores one or more models, micro services, or tools. The DevOps CI/CD pipeline 406 can include one or more routines to allow a client to customize the IVR system. The DevOps CI/CD pipeline 406 can include one or more testing routines. The testing routines can be used to ensure the proper operation of the provisioned system.

The storage system (e.g., a cloud storage server 402) can store one or more IVR system call flows 408. The IVR call flows 408 can determine an order that the one or more features are presented to customers in the IVR system. The call flows 408 can be built using SCXML pages.

The storage system (e.g., a cloud storage server 402) can store contact center provider systems 410. Example contact center provider systems 410 can include composers, voice platforms, and orchestration routing servers. The provisioned model is designed to be layered on top of contact center provider's systems and software.

Figure 5:
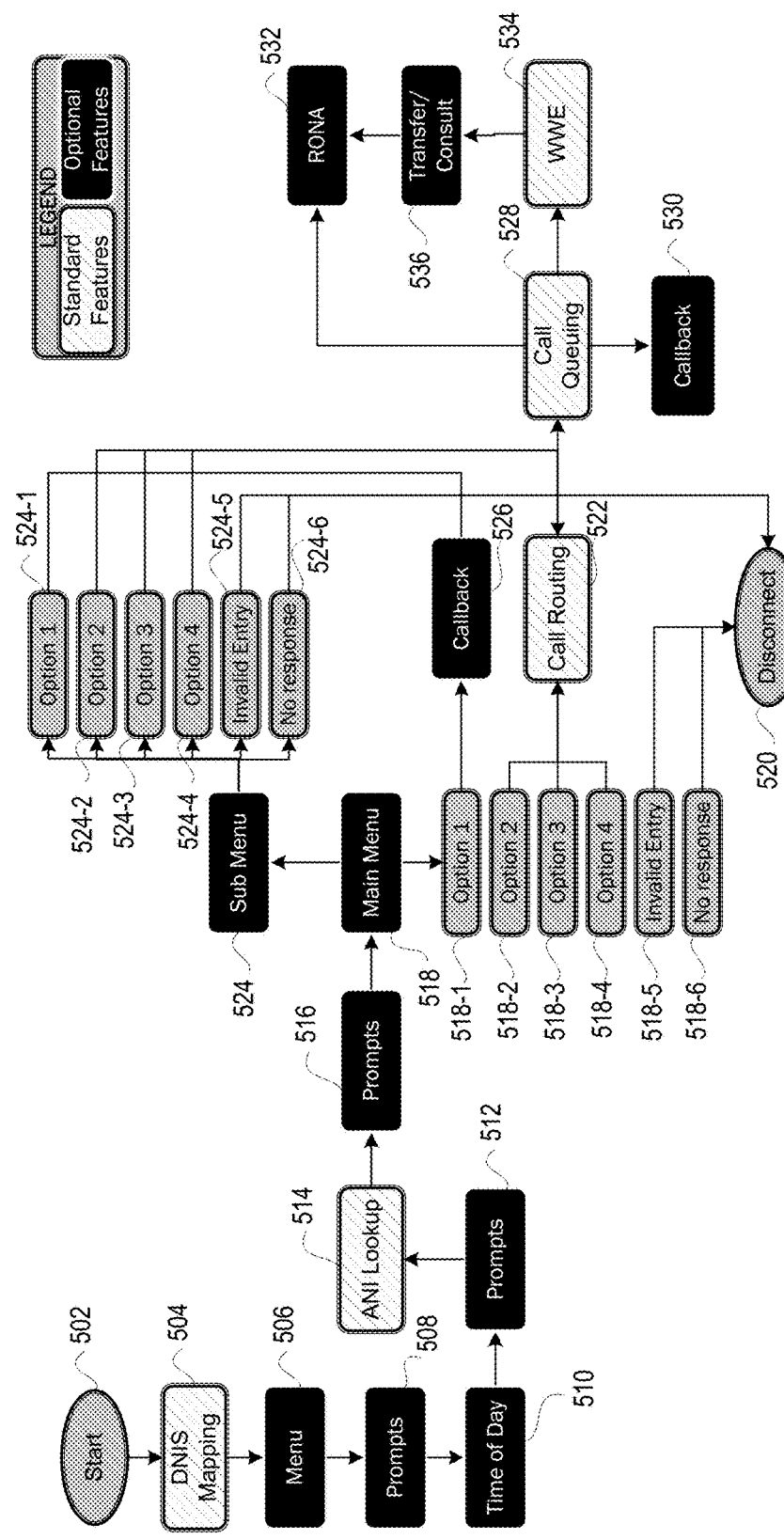
FIG. 5 illustrates an example flow for an interactive contact center model.

FIG. 5 illustrates an example flow 500 for an interactive contact center model. FIG. 5 is merely one of many examples of an interactive contact center model.

At 502, the process 500 can begin when a call is received by the IVR system. In some examples, the IVR system has one dial in number. In some examples, the IVR system can include multiple telephone numbers that route calls into the system.

At 504, the process can perform DNIS mapping on the incoming call. DNIS information can be used for call routing to internal destinations or activation of special call handling.

At 506, the process can provide a menu to the incoming caller. The menu can be provided to the caller via a prerecorded message. In some examples, the menu can be provided by an intelligent agent using a computer-generated voice. The caller may be able to select an option using a voice response or by selecting a number on the phone keypad.

At 508 the process can provide one or more prompts to the caller. IVR systems can use voice prompts to provide callers with instructions and directions for accessing information via telephone. Voice prompts can be used within an IVR by using audio files that provide greetings or informational messages within a telephone voice processing system. Voice prompts can be sentences, phrases or individual words.

At 510 the process can provide a TOD feature. The TOD feature can determine one or more of the time, time zone, date, and day of the week of an incoming call. The TOD feature can be used to determine if an after-hours or holiday recorded message should be played to the caller.

At 512, the process can provide one or more prompts to the caller. Voice prompts can be used within an IVR by using audio files that provide greetings or informational messages within a telephone voice processing system. Voice prompts can be sentences, phrases or individual words.

At 514, the process can perform automatic number identification (ANI) Lookup. ANI is the automatic determination of the caller's telephone number on a call, including for billing purposes. The IVR system can use the ANI Lookup feature for identifying a customer account.

At 516, the process can provide one or more voice prompts to the caller. Voice prompts can be used within an IVR by using audio files that provide greetings or informational messages within a telephone voice processing system. Voice prompts can be sentences, phrases or individual words.

At 518, the process can provide a main menu to the caller. The main menu can list one or more options (e.g., Option-1 518-1, Option-2 518-2, Option-3 518-3, or Option-4 518-4). The main menu process also provides for invalid entries 518-5 and no responses 518-6. Invalid entries 518-5 and no responses 518-6 can lead to disconnection 520 of the call. One option (e.g., Option-1 518-1) may initiate a callback feature 522 that initiates a callback to the incoming caller when it is their place in queue.

At 524, the process can provide one or more sub-menus. The submenus can include one or more options (e.g., Option-1 524-1, Option-2 524-2, Option-3 524-3, and Option-4 523-4). The submenu process also provides for invalid entries 523-5 and no responses 524-6. One option (e.g., Option-4 524-1) may initiate a callback feature 526 that initiates a callback to the incoming caller when it is their place in queue.

At 522, the process can provide call routing. The call routing can be based on the options selected in response to the main menu, at 518, or the one or more sub-menus, at 524. The IVR system may route the call to an agent or queue based at least in part on the response or non-response to the prompt. For example, if the main menu indicates "Press or Say one for billing."

At 528, the process can route the calls to a queue if an agent is not available. Call queues are the lines that callers are placed in after they have been routed through the IVR system. A call queue can lines up to a specific ring group.

At 530, the process can provide a caller in a queue a callback feature. In some instances, caller queues can become long and the callback feature allows a caller to retain their place in line and receive a call back when they are up in queue. The callback feature can utilize the Caller ID feature to determine the caller's telephone number.

At 532, the process can include a RONA feature. The IVR can detect when a caller does not response to questions or prompts for the system. The RONA feature can prompt a caller to respond.

At 534, the process can include a WWE feature. The WWE feature 326 allows for custom options for access to the IVR system throughout the world.

At 536, the process can include a transfer/consult feature. The transfer/consult feature can allow the incoming call to be transferred internal to the contact center, external to the contact center, or to a conference call. The transfer/consult feature can allow the incoming call to be transferred from one agent to another, an agent to a supervisor, or a supervisor back to an agent.

Figure 6:
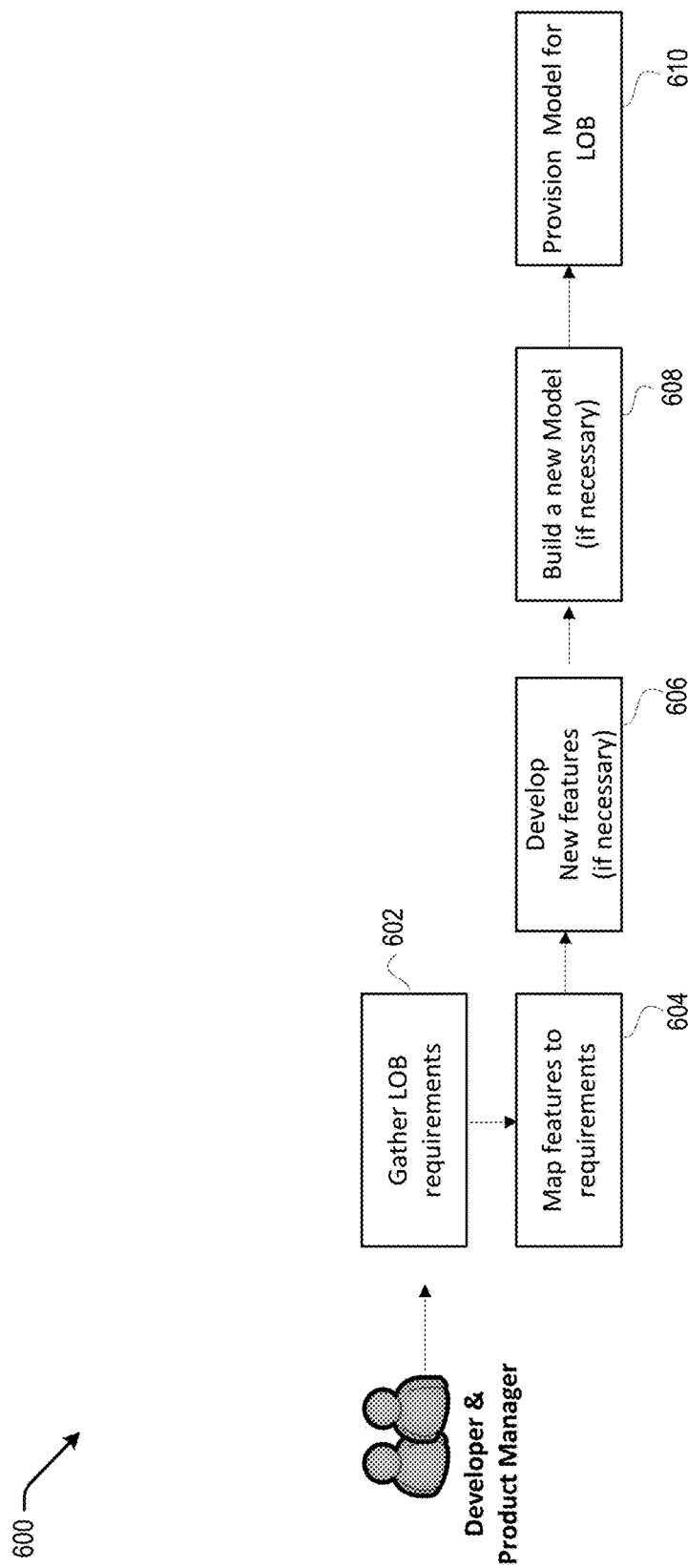
FIG. 6 illustrates an example process flow for development for an interactive contact center.

FIG. 6 illustrates an example process flow 600 for development for an interactive contact center. The disclosed process uses a development approach where the model employs reusable feature components on top of contact center venter routing capabilities. In the model/micro service approach, LOBs are assigned to specific call flows (Models) that are defined in the model configuration database. As such, micro service code that performs the one or more selected features are shared across LOBs and deployments can be data-driver to decrease the LOB onboarding cycle.

At 602, the developer and/or product manager can gather LOB requirements from the system. The LOB requirements can include the number of menus and submenus, language requirements, legal requirements, predicted call capacity, number of agents, expected agent capabilities, etc. Product management partners with business to analyze the LOB requirements to understand if the requirements match with an existing feature(s) on model(s).

After the LOB requirements are outlined, the developer and/or product manager can map, at 604, the available features stored in the system to the requirements. For example, if LOB requirements specific a need for a legal disclaimer, the system can include a legal disclaimer feature in the model. The technique can select from the features in the storage system. Each of the features can include metadata that identifies the purpose and the capabilities of the feature. The system can search the metadata of the stored features to identify features that includes metadata that matches the LOB requirements.

At 606, the system can develop new features (if necessary).

At 608, the system can build a new model based on the features and LOB requirements. The system can first analyze the metadata associated with the one or more stored models to determine if the stored models can meet the LOB requirements or can be modified to meet the requirements. The system can also build a new model to include the one or more features to meet the LOB requirements.

At 610, the system can provision the model for the LOB requirements. The provisioning can include determining if the one or more features will be ON or OFF. The provisioning can also include determining the number of menus or submenus, recording the greetings, and determining when different pre-recording messages will be played.

Figure 7:
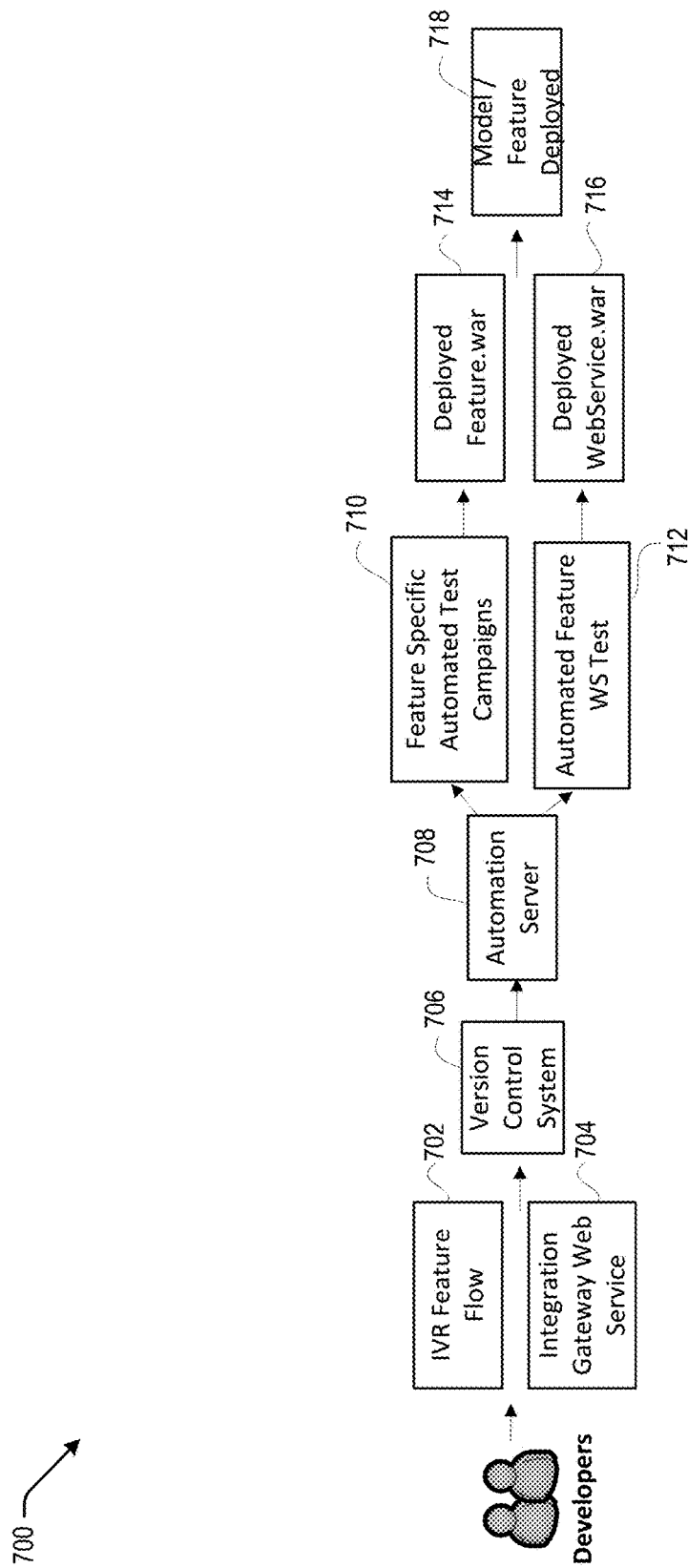
FIG. 7 illustrates an example process flow for micro service feature development for an interactive contact center.

FIG. 7 illustrates an example process flow 700 for micro service feature development for an interactive contact center. Each feature can include a feature flow using code (e.g., SCXML code) and integrated gateway web services (e.g., using Java code).

At 702, the developers can select the IVR feature flow. In some examples, the feature flow can be developed using SCXML code.

At 704, the developers can select one or more integration gateway web services. The web services and be developed using Java code.

At 706, a distributed version-control system (e.g., git) can determine and provide a version for the micro service feature.

At 708, an automation server (e.g., Jenkins) can automate the parts of software development related to building, testing, and deploying, facilitating continuous integration and continuous delivery.

At 710, the features can be tested using feature specific automated test campaigns. Functional testing for software development is a process that ensures that the software developed conforms to all the requirements. IVR functional testing needs to ensure that a newly developed or updated IVR performs as designed. Automated scripting is required so that test scripts are always up-to-date. Regression testing is a type of software testing that ensures that previously developed and tested software still performs the same way after it is changed or interfaced with other software. For IVR testing, regression testing should ensure that updates have not broken any other parts of the IVR software. Commercially available testing tools (e.g., Cyara) can be used to test the feature flows.

At 712, the one or more automated features can be tested. Automatic code review tools (e.g., Junit and SonarCube) provide an automatic code review tool to detect bugs and vulnerabilities in the code. In various examples, the automatic code review tool can integrate with the existing workflow to enable continuous code inspection across the project branches and pull requests.

At 714, the feature flow can be deployed. The feature flow can be deployed using a deployment tool (e.g., Tomcat). Tomcat is an implementation of the Java Servlet, JavaServer Pages, Java Expression Language and WebSocket technologies. Tomcat can provides a "pure Java" HTTP web server environment in which Java code can run.

At 716, the web services can be deployed using an application server (e.g., WebLogic). WebLogic is an online transaction processing (OLTP) platform, developed to connect users in a distributed computing environment and to facilitate the integration of mainframe applications with distributed corporate data and applications. WebLogic Server centralizes application services such as Web server functionality, business components, and access to backend enterprise systems.

At 718, the model and the one or more features is deployed to the contact center provider systems.

Figure 8:
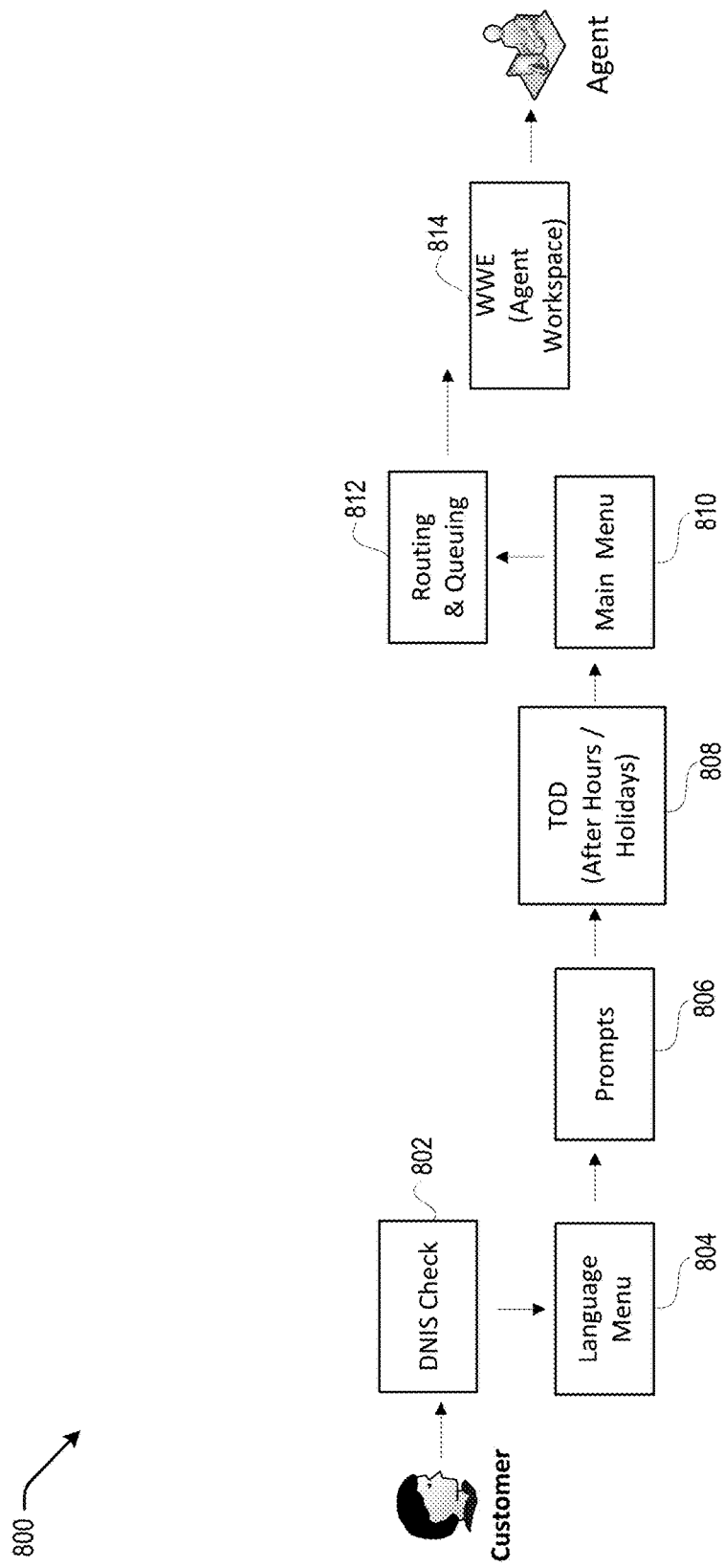
FIG. 8 illustrates an example process flow for designing a model for an interactive contact center.

FIG. 8 illustrates an example process flow 800 for designing a model for an interactive contact center. As shown in the flow, a customer can dial a number for an IVR system. The features can be combined in a specific order to derive a Model Flow which can be provisioned to meet needs of multiple customers.

At 802, a DNIS check can be performed. The DNIS check can identify the originally dialed telephone number of an inbound call. The client may use this information for call routing to internal destinations or activation of special call handling. For DNIS service, the telephone company sends a sequence of typically four to ten digits during call setup.

At 804, a language menu can solicit the language the caller prefers to conduct the call.

At 806, the IVR system can solicit inputs from a caller via one or more prompts. In some examples, the language can be selected from a plurality of languages by prompting the caller to speak or press a number on a keypad.

At 808, the TOD feature can determine one or more of the time, time zone, date, and day of the week of an incoming call. The TOD feature can be used to determine if an after-hours or holiday recorded message should be played to the caller.

At 810, the IVR system can provide a main menu for the caller. The main menu can allow a user to select from one or more options. The one or more options can provide access to one or more sub-menus. The options can allow for more appropriate routing of the call. For example, a "billing" option will direct a caller to the billing department instead of an agent.

At 812, the IVR system can route the incoming call based at least in part on the caller's response to the menu prompt. The IVR system can also provide for one or more queues for callers if agents are not available.

At 814, the call can be routed to an agent workspace. The workspace can allow an agent to assist the caller. The workspace can provide the agent with information on the caller. The information can include the caller telephone number. The information can also include an account information associated with accounts associated with the telephone number. The call history can also include call history information associated with the telephone number.

The system can allow an agent to enter information associated (e.g., record of actions taken on the call).

Figure 9:
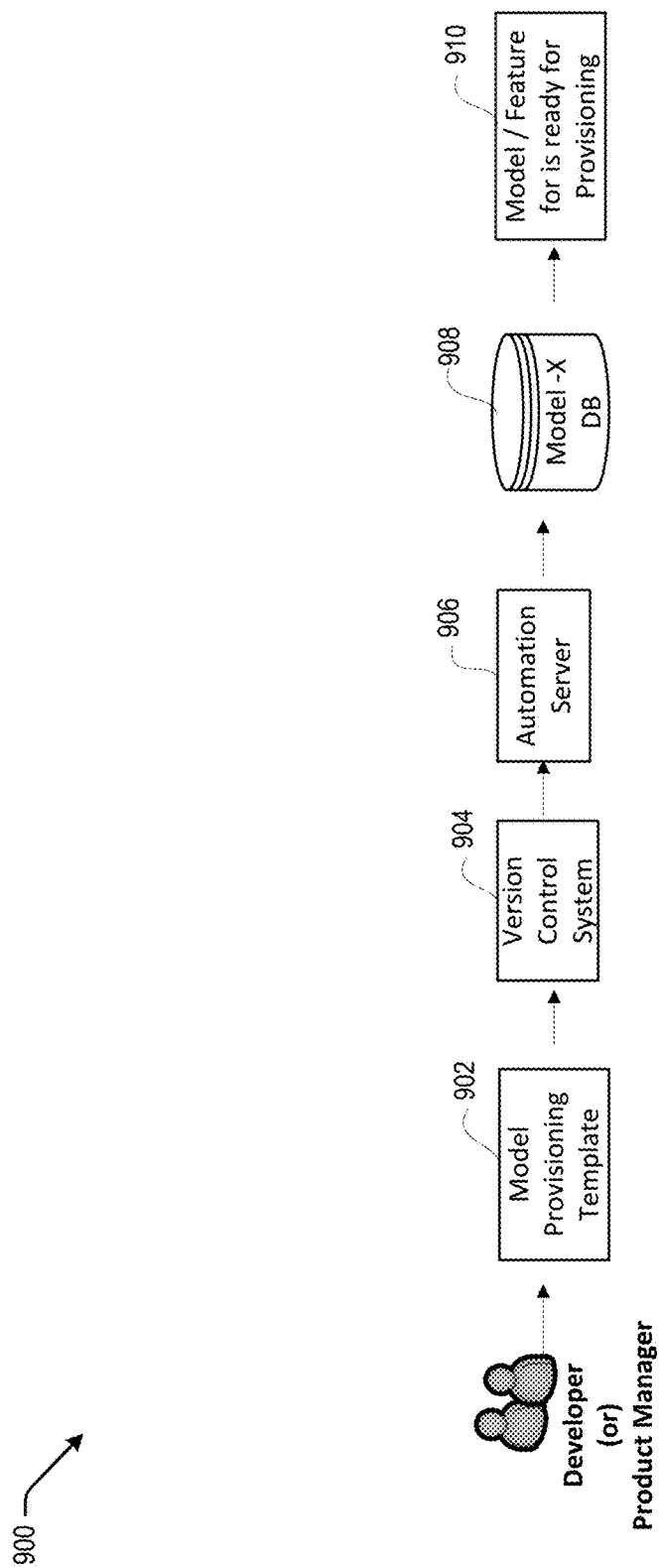
FIG. 9 illustrates an example process flow for configuring a model for an interactive contact center.

FIG. 9 illustrates an example process flow 900 for configuring a model for an interactive contact center. Feature and Model-specific data can be configured using a template (e.g., an Excel template) which flows through CI/CD pipeline. The template can specify which features are activated or deactivated. Data can executed using database pipeline and waveform audio (WAV) files can be executed using prompts CI/CD Pipeline.

At 902, the developer or product manager can complete a model-provisioning template. The template can list one or more available features and allow the developer or product manager to specify whether the one or more available features are active or inactive.

At 904, a distributed version-control system (e.g., git) can determine and provide a version for the configuration flow.

At 906, an automation server (e.g., Jenkins) can automate parts of software development related to building, testing, and deploying, facilitating continuous integration and continuous delivery. The output of the automation service is a model.

At 908, the model can be stored in a database server.

Figure 10:
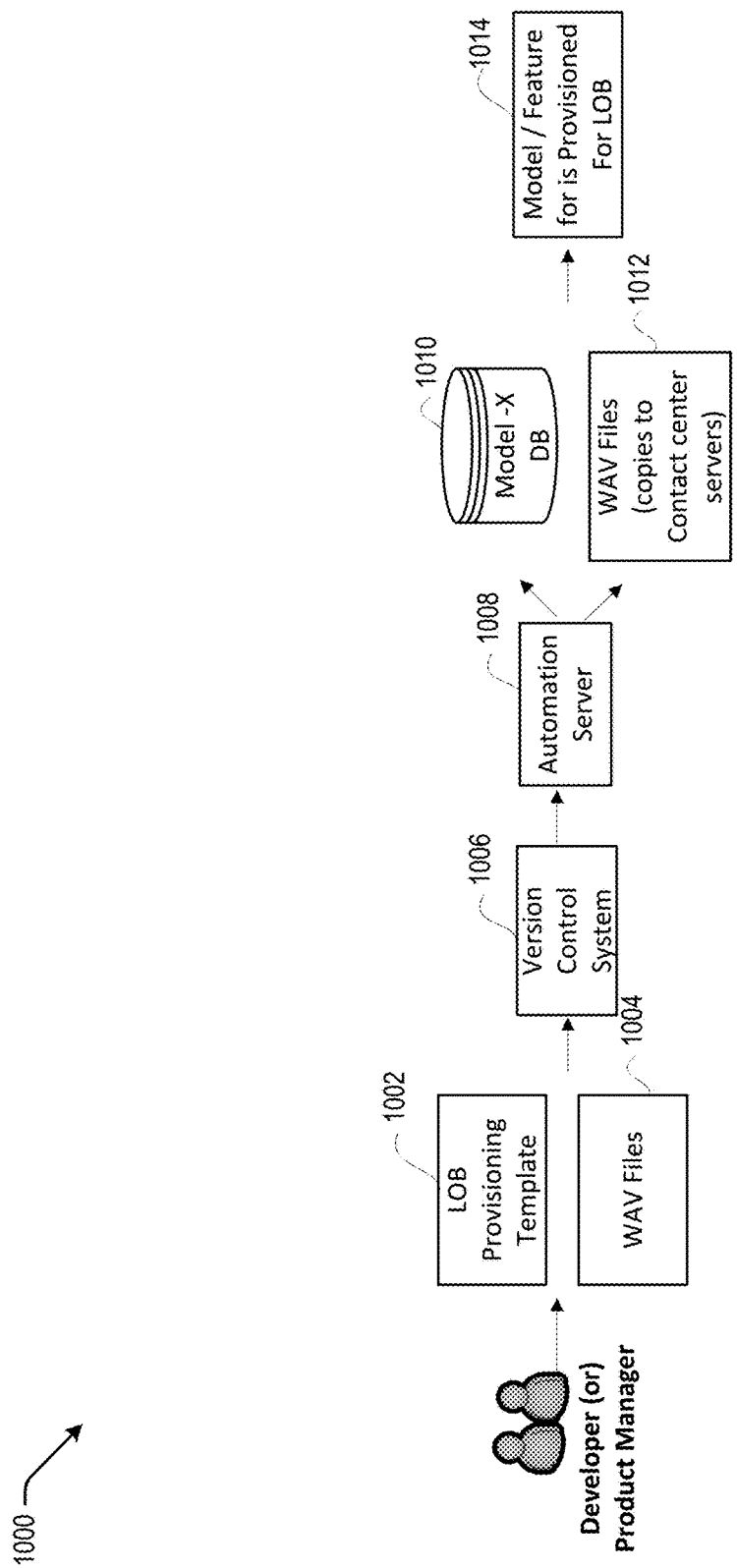
FIG. 10 illustrates an example process for provisioning customers on a model for an interactive contact center.

At 910, the model is ready for provisioning which is described in FIG. 10.

FIG. 10 illustrates an example process 1000 for provisioning customers on a model for an interactive contact center. Overall, the Model can introduce a micro service approach to the Contact Center for flexibility and reusability with "plug and play style" within the call flow. The advantages to doing this are: increased reliability, reduced number of bugs and quicker time to market for new LOBs. Also, due to the reusable aspect of building the features, that change is immediately available to customers to consume. The intent is that Model Flow (#) is provisioned for one or more specific LOBs.

At 1002, a developer or product manager can complete a LOB provisioning template (e.g., an Excel file). The template can specify the one or more features that the developer or product manager wants to be activated for the specific model version.

At 1004, the developer or product manager can upload the audio files (e.g., WAV) format to the application server. The audio files can include the various recorded greetings, disclaimers, prompts, and audio menus that can be used for the IVR system.

At 1006, a distributed version-control system (e.g., git) can determine and provide a version for the configuration flow.

At 1008, an automation server (e.g., Jenkins) can automate parts of software development related to building, testing, and deploying, facilitating continuous integration and continuous delivery. The output of the automation service is a model.

At 1010, the model can be stored in a database server. The database server can be a cloud-based server.

At 1012, the audio files can be copied to a contact server provider's servers. The contact server provider's servers can be a cloud-based server system.

At 1014, the model can be provisioned for the LOB.

Figure 11:
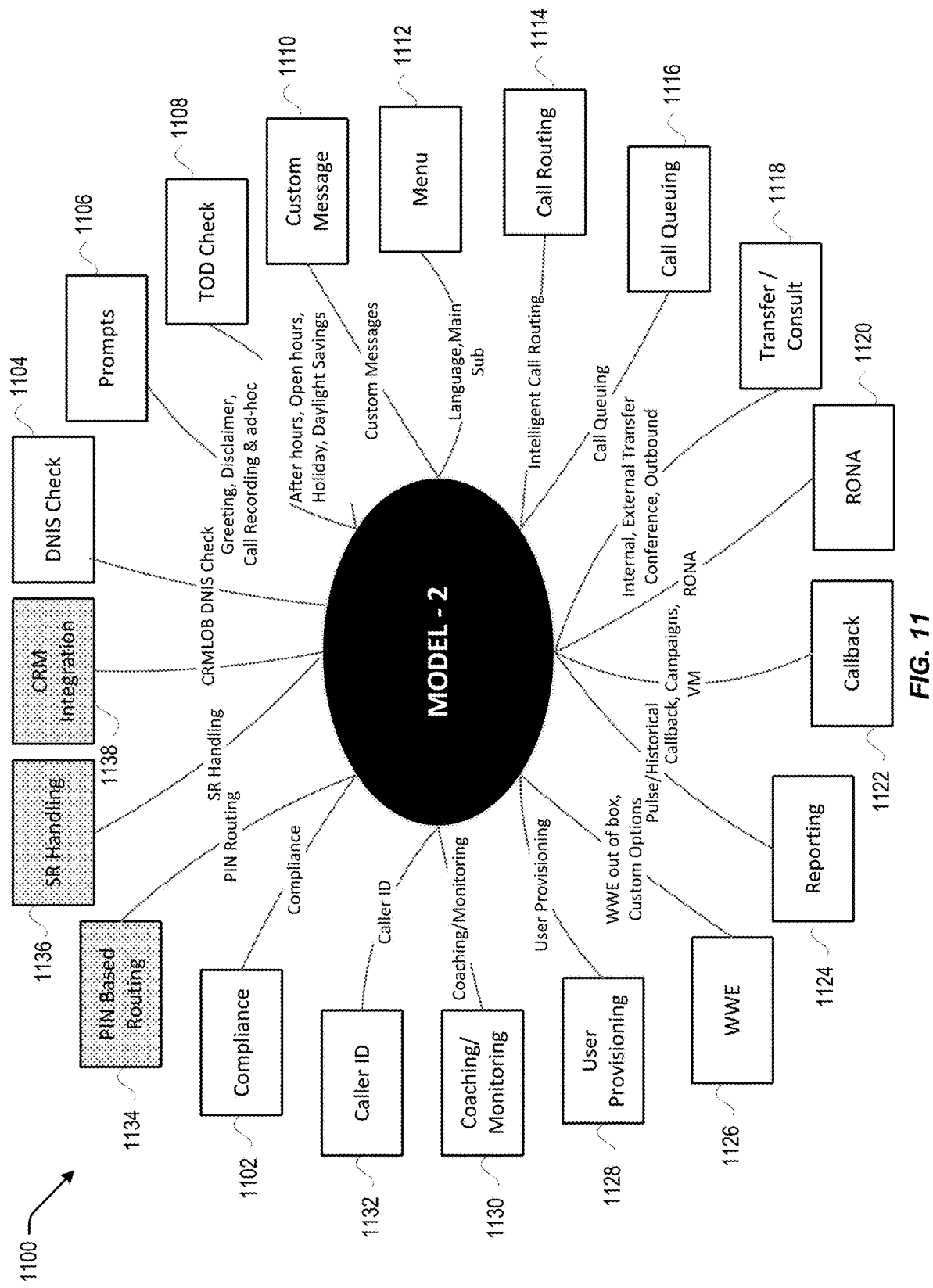
FIG. 11 illustrates a second example of model features for an interactive contact center.

FIG. 11 illustrates a second example of model features for an interactive contact center. FIG. 11 illustrates an example of a model 1100 including various features for an interactive contact center. Each feature needs to be developed & tested individually. Micro services need to be built for each feature. The IVR features can be developed independently or combined based on nature of feature. Each feature can allow versioning, in addition each combination of features can be versioned. Some features can be designated as mandatory and cannot be turned off at a line of business (LOB) level. Other features can be turned ON/OFF at provisioning time according to the LOB. Each feature can allow options which can be configured at provisioning time.

FIG. 11 illustrates that the second model 1100 can have one or more features such as: compliance feature 1102, DNIS check feature 1104, prompt feature 1106, TOD checks 1108, custom message feature 1110, menu features 1112, call routing feature 1114, call queuing feature 1116, transfer/consult feature 1118, RONA feature 1120, callback feature 1122, reporting feature 1124, WWE feature 1126, user provisioning 1128 coaching/monitoring 1130, and caller ID feature 1132. These features have been described above with respect to FIG. 3.

The second model 1100 can include PIN based routing feature 1134, SR Handling feature 1136, and a customer relationship management (CRM) integration feature 1136. PIN based routing feature 1134 is a feature that allows an IVR system to accept calls from callers only after they have entered a PIN that is valid and verified by your phone system. The PIN based routing feature 1134 can provide callers direct access to departments or individuals based on a PIN that they enter after being prompted to do so. The caller dials a main number, and can either be immediately presented with a PIN request or go through a menu option to guide them to a segment where their PIN is requested. Once a recognized PIN has been keyed in, the system will route the caller to the appropriate call handler based on that specific PIN. The PIN based routing feature 1134 can be used for very important person (VIP) access, user validation, service level differentiation, emergency provisioning, and after hours support.

The second model 1100 can include a service request (SR) handling feature 1136. The SR handling feature 1136 provides an improved service request process for clients to easily handle service requests through multiple channels, support mobile transactions, empower agents with role-based dashboards, and improve agent productivity with drag and drop workflow design on dashboards. The SR handling feature 1136 can receive service requests from all channels (social, email, phone, etc.) for optimal routing and field technician assignments. The SR handling feature 1136 can manage service schedule by setting priorities and assign engineers to perform repairs. The SR handling feature 1136 can create and monitor repair schedules. The SR handling feature 1136 can follow up to ensure that technicians perform repairs, visit customers, inspect the item, and perform required fixes. The SR handling feature 1136 can report parts used for the onsite repairs and track the inventory status. The SR handling feature 1136 can enter orders for service rendered and settle any service charges. The SR handling feature 1136 can close service request and record customer confirmation.

The second model 1100 can include a CRM feature 1138. CRM features 1138 can assist companies track all customer interactions. CRM software can log phone numbers, purchases, refunds, marketing engagement, and many other touchpoints. CRM software can provide a complete digital customer history. Customer service agents can fill out profiles with info from calls, emails, and other channels. A detailed customer support history gives each agent context on every customer. Customer service agents can skip redundant questions and help callers faster. Managers can use call data and reports to track agent and call center performance. Sales teams can keep track of prospects across all stages of their pipeline.

Figure 12:
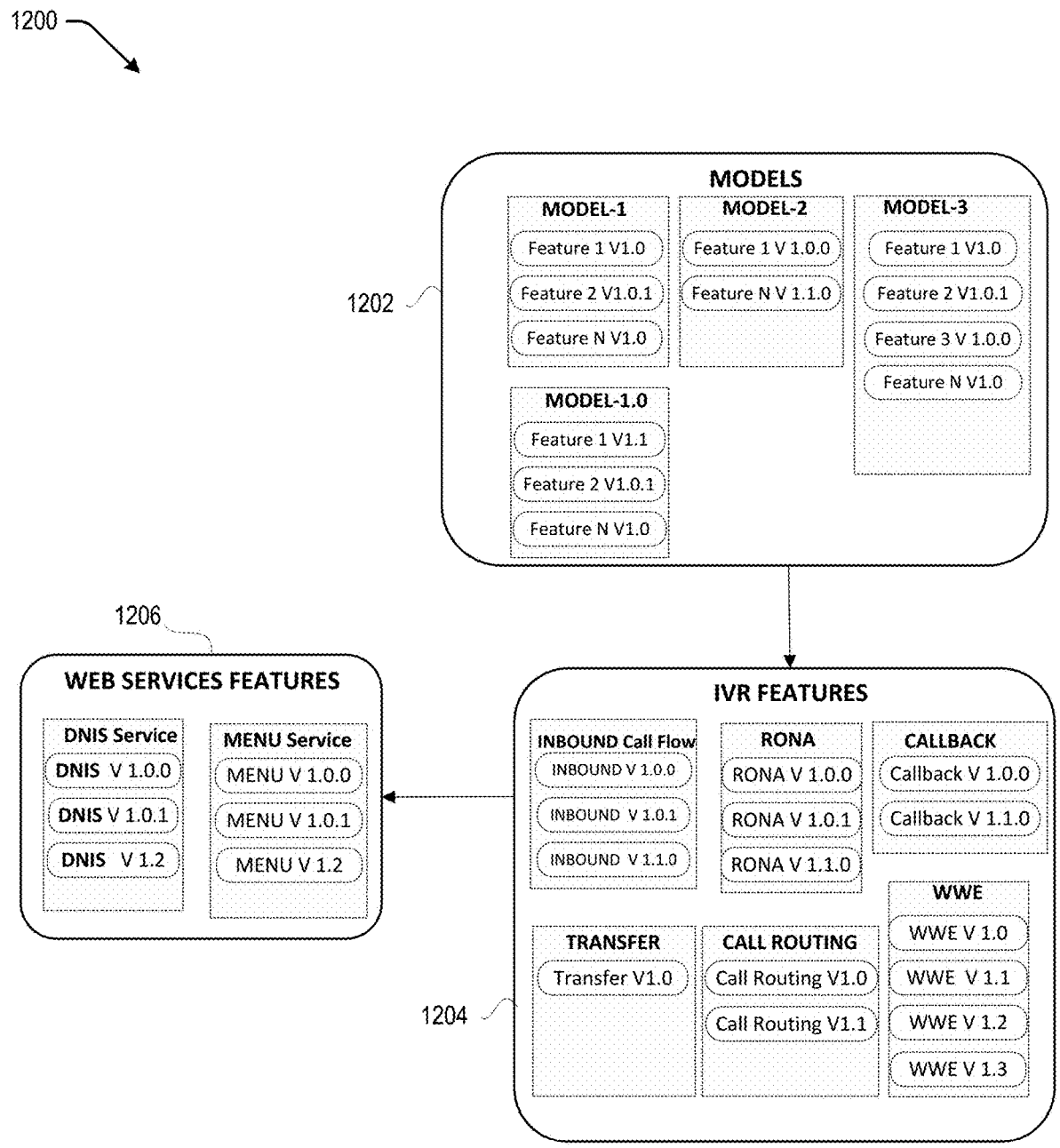
FIG. 12 illustrates a mapping of model feature versions for an interactive contact center.

FIG. 12 illustrates a mapping 1200 of model feature versions for an interactive contact center. As shown in FIG. 12, the model store various model versions 1202. For example, three base models (e.g., Model 1, Model 2, and Model 3) can be stored. In addition, different versions of the base models can be stored (e.g., Model 1.1). Each of the stored models can utilize various features. Each of the features can include different versions of the features.

FIG. 12 illustrates various IVR features 1204. The IVR features 1204 can include one or more features such as: inbound call flow, RONA, callback, Transfer, Call routing, and WWE. Each of the features can include various different versions of the feature.

FIG. 12 illustrates various web services features 1206. The web service features can include DNIS service and menu services. Web service is a collection of open source protocols and standards used for exchanging data between systems or applications.

Figure 13:
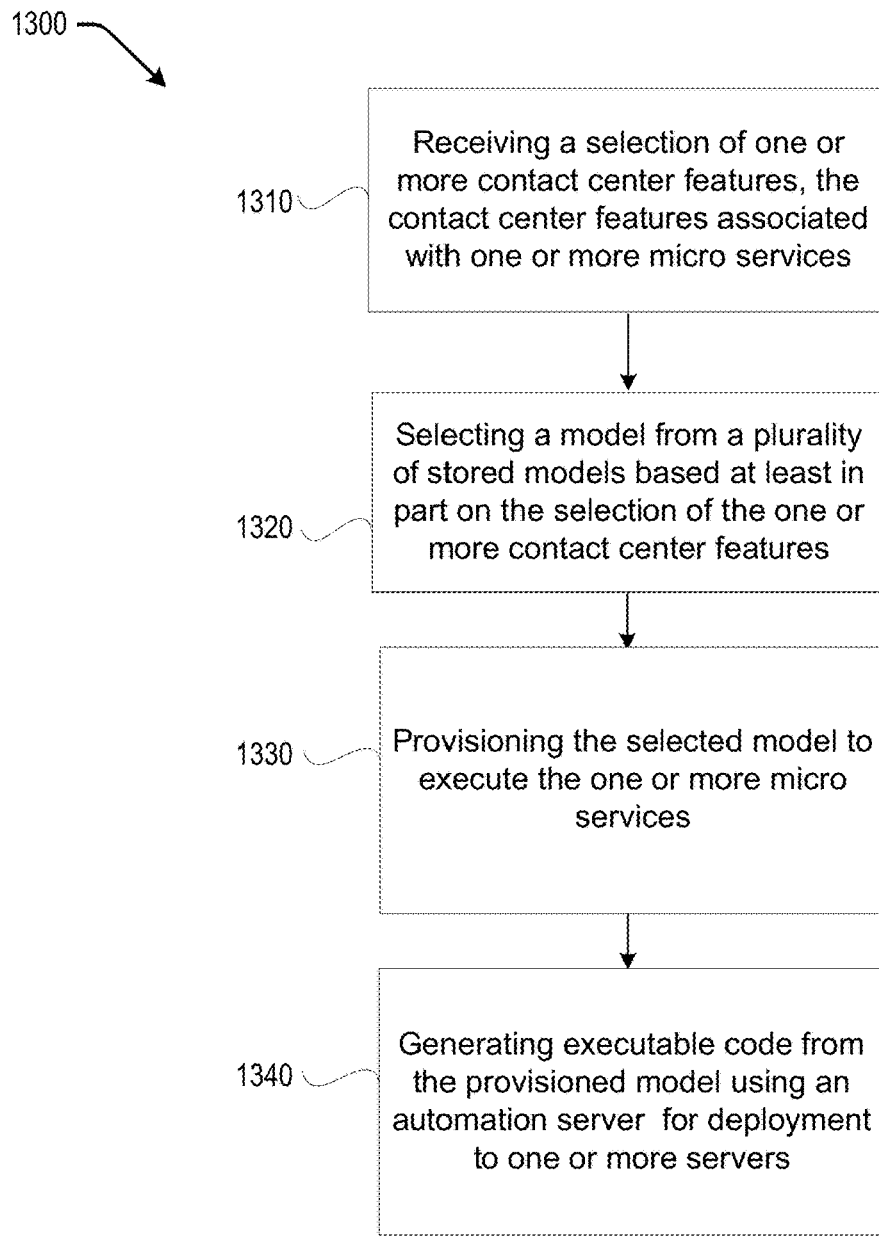
FIG. 13 illustrates an example flow for a technique for building and optimizing a FIG. 14 is a block diagram illustrating one pattern for implementing a cloud infrastructure as a service system, according to at least one embodiment.

FIG. 13 is a flowchart of an example process 1300 associated with techniques for building and optimizing contact service centers. In some implementations, one or more process blocks of FIG. 13 may be performed by a computing device (e.g., computing device 1800). Additionally, or alternatively, one or more process blocks of FIG. 13 may be performed by one or more components of device 1800, such as processor 1804, storage subsystem 1818, input/output subsystem 1808, and/or communication subsystem 1824

As shown in FIG. 13, process 1300 may include receiving a selection of one or more contact center features, the contact center features associated with one or more micro services configured to execute the one or more contact center features (block 1310). For example, the computing device may receive a selection of one or more contact center features, the contact center features associated with one or more micro services configured to execute the one or more contact center features, as described above. Software applications are written using various programming languages and running on multiple platforms. It allows you to use web services to exchange data over computer networks.

As further shown in FIG. 13, process 1300 may include selecting a model from a plurality of stored models based at least in part on the selection of the one or more contact center features, the selected model comprising programmable code configured to execute the one or more micro services (block 1320). For example, the computing device may select a model from a plurality of stored models based at least in part on the selection of the one or more contact center features, the selected model comprising programmable code configured to execute the one or more micro services, as described above. In various examples, metadata can be used to automatically select a model.

As further shown in FIG. 13, process 1300 may include provisioning the selected model to execute the one or more micro services (block 1330). For example, the computing device may provision the selected model to execute the one or more micro services, as described above.

As further shown in FIG. 13, process 1300 may include generating executable code from the provisioned model using an automation server for deployment to one or more servers (block 1340). For example, the computing device may generate executable code from the provisioned model using an automation server for deployment to one or more servers, as described above. The code can be packaged and deployed using available industry tools (e.g., Maven, GitHub etc.) At run time all the model code can be executed. Model code can be integrated with contact vendor software via Representational State Transfer (REST) APIs. A REST API (also known as RESTful API) is an application programming interface (API or web API) that conforms to the constraints of REST architectural style and allows for interaction with RESTful web services.

Process 1300 may include additional implementations, such as any single implementation or any combination of implementations described below and/or in connection with one or more other processes described elsewhere herein.

In a first implementation, process 1300 includes receiving one or more inputs for a customized flow that provides an order for executing the one or more contact center features.

In a second implementation, alone or in combination with the first implementation, the one or more micro services comprise respective web services.

In a third implementation, alone or in combination with one or more of the first and second implementations, process 1300 includes testing an ability of the selected model to execute the one or more micro services.

In a fourth implementation, alone or in combination with one or more of the first through third implementations, at least some of the contact center features comprise different contact center features versions from the other contact center features.

In a fifth implementation, alone or in combination with one or more of the first through fourth implementations, each of the one or more contact center features comprises a front end component and a back end component, wherein the front end component uses a markup language that is both human-readable and machine-readable.

In a sixth implementation, alone or in combination with one or more of the first through fifth implementations, the back end component uses an object-oriented programming language.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud-computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 14:
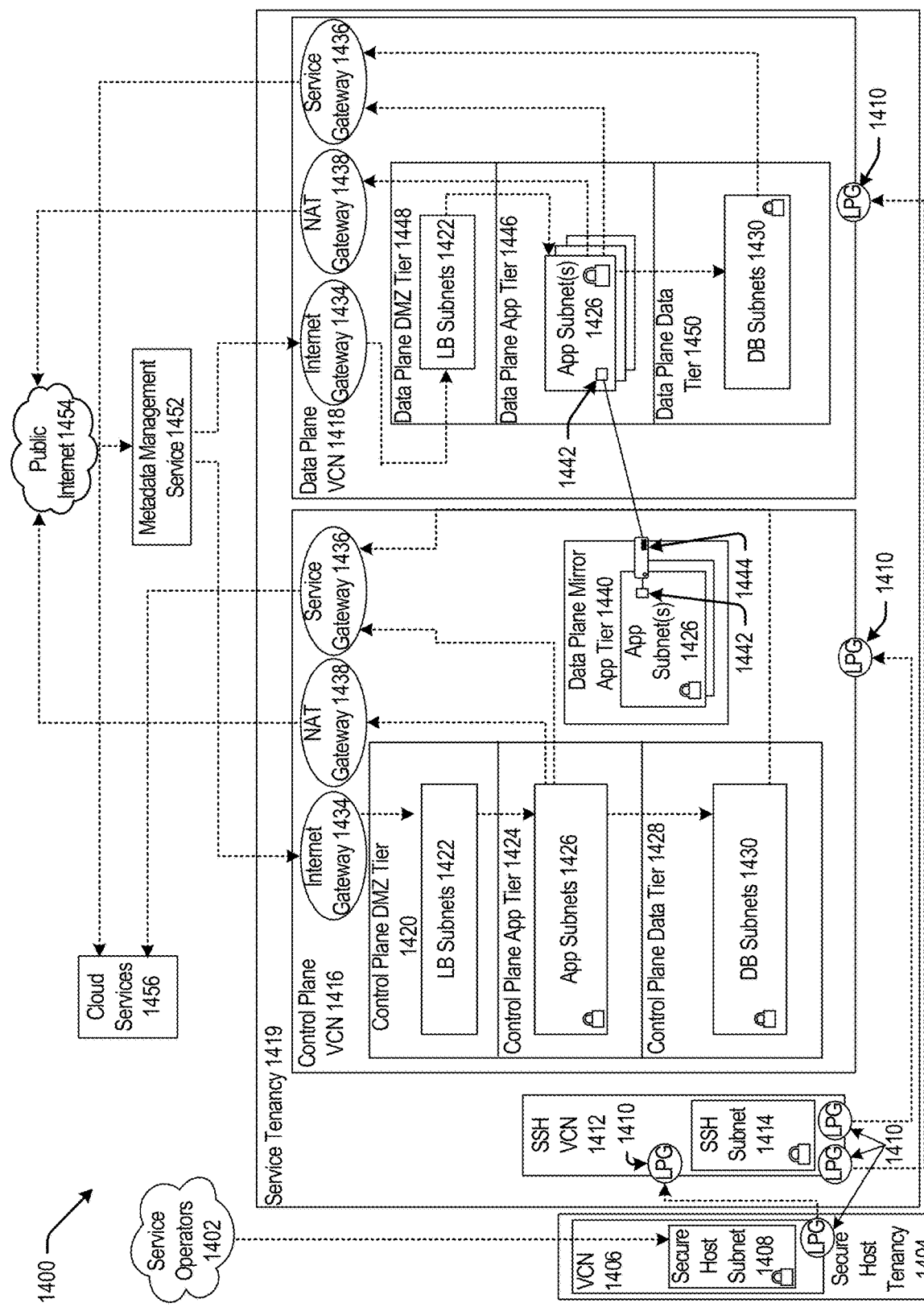

FIG. 14 is a block diagram 1400 illustrating an example pattern of an IaaS architecture, according to at least one embodiment. Service operators 1402 can be communicatively coupled to a secure host tenancy 1404 that can include a virtual cloud network (VCN) 1406 and a secure host subnet 1408. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1406 and/or the Internet.

The VCN 1406 can include a local peering gateway (LPG) 1410 that can be communicatively coupled to a secure shell (SSH) VCN 1412 via an LPG 1410 contained in the SSH VCN 1412. The SSH VCN 1412 can include an SSH subnet 1414, and the SSH VCN 1412 can be communicatively coupled to a control plane VCN 1416 via the LPG 1410 contained in the control plane VCN 1416. Also, the SSH VCN 1412 can be communicatively coupled to a data plane VCN 1418 via an LPG 1410. The control plane VCN 1416 and the data plane VCN 1418 can be contained in a service tenancy 1419 that can be owned and/or operated by the IaaS provider.

The control plane VCN 1416 can include a control plane demilitarized zone (DMZ) tier 1420 that acts as a perimeter network (e.g., portions of a corporate network between the corporate intranet and external networks). The DMZ-based servers may have restricted responsibilities and help keep breaches contained. Additionally, the DMZ tier 1420 can include one or more load balancer (LB) subnet(s) 1422, a control plane app tier 1424 that can include app subnet(s) 1426, a control plane data tier 1428 that can include database (DB) subnet(s) 1430 (e.g., frontend DB subnet(s) and/or backend DB subnet(s)). The LB subnet(s) 1422 contained in the control plane DMZ tier 1420 can be communicatively coupled to the app subnet(s) 1426 contained in the control plane app tier 1424 and an Internet gateway 1434 that can be contained in the control plane VCN 1416, and the app subnet(s) 1426 can be communicatively coupled to the DB subnet(s) 1430 contained in the control plane data tier 1428 and a service gateway 1436 and a network address translation (NAT) gateway 1438. The control plane VCN 1416 can include the service gateway 1436 and the NAT gateway 1438.

The control plane VCN 1416 can include a data plane mirror app tier 1440 that can include app subnet(s) 1426. The app subnet(s) 1426 contained in the data plane mirror app tier 1440 can include a virtual network interface controller (VNIC) 1442 that can execute a compute instance 1444. The compute instance 1444 can communicatively couple the app subnet(s) 1426 of the data plane mirror app tier 1440 to app subnet(s) 1426 that can be contained in a data plane app tier 1446.

The data plane VCN 1418 can include the data plane app tier 1446, a data plane DMZ tier 1448, and a data plane data tier 1450. The data plane DMZ tier 1448 can include LB subnet(s) 1422 that can be communicatively coupled to the app subnet(s) 1426 of the data plane app tier 1446 and the Internet gateway 1434 of the data plane VCN 1418. The app subnet(s) 1426 can be communicatively coupled to the service gateway 1436 of the data plane VCN 1418 and the NAT gateway 1438 of the data plane VCN 1418. The data plane data tier 1450 can also include the DB subnet(s) 1430 that can be communicatively coupled to the app subnet(s) 1426 of the data plane app tier 1446.

The Internet gateway 1434 of the control plane VCN 1416 and of the data plane VCN 1418 can be communicatively coupled to a metadata management service 1452 that can be communicatively coupled to public Internet 1454. Public Internet 1454 can be communicatively coupled to the NAT gateway 1438 of the control plane VCN 1416 and of the data plane VCN 1418. The service gateway 1436 of the control plane VCN 1416 and of the data plane VCN 1418 can be communicatively couple to cloud services 1456.

In some examples, the service gateway 1436 of the control plane VCN 1416 or of the data plan VCN 1418 can make application programming interface (API) calls to cloud services 1456 without going through public Internet 1454. The API calls to cloud services 1456 from the service gateway 1436 can be one-way: the service gateway 1436 can make API calls to cloud services 1456, and cloud services 1456 can send requested data to the service gateway 1436. But, cloud services 1456 may not initiate API calls to the service gateway 1436.

In some examples, the secure host tenancy 1404 can be directly connected to the service tenancy 1419, which may be otherwise isolated. The secure host subnet 1408 can communicate with the SSH subnet 1414 through an LPG 1410 that may enable two-way communication over an otherwise isolated system. Connecting the secure host subnet 1408 to the SSH subnet 1414 may give the secure host subnet 1408 access to other entities within the service tenancy 1419.

The control plane VCN 1416 may allow users of the service tenancy 1419 to set up or otherwise provision desired resources. Desired resources provisioned in the control plane VCN 1416 may be deployed or otherwise used in the data plane VCN 1418. In some examples, the control plane VCN 1416 can be isolated from the data plane VCN 1418, and the data plane mirror app tier 1440 of the control plane VCN 1416 can communicate with the data plane app tier 1446 of the data plane VCN 1418 via VNICs 1442 that can be contained in the data plane mirror app tier 1440 and the data plane app tier 1446.

In some examples, users of the system, or customers, can make requests, for example create, read, update, or delete (CRUD) operations, through public Internet 1454 that can communicate the requests to the metadata management service 1452. The metadata management service 1452 can communicate the request to the control plane VCN 1416 through the Internet gateway 1434. The request can be received by the LB subnet(s) 1422 contained in the control plane DMZ tier 1420. The LB subnet(s) 1422 may determine that the request is valid, and in response to this determination, the LB subnet(s) 1422 can transmit the request to app subnet(s) 1426 contained in the control plane app tier 1424. If the request is validated and requires a call to public Internet 1454, the call to public Internet 1454 may be transmitted to the NAT gateway 1438 that can make the call to public Internet 1454. Memory that may be desired to be stored by the request can be stored in the DB subnet(s) 1430.

In some examples, the data plane mirror app tier 1440 can facilitate direct communication between the control plane VCN 1416 and the data plane VCN 1418. For example, changes, updates, or other suitable modifications to configuration may be desired to be applied to the resources contained in the data plane VCN 1418. Via a VNIC 1442, the control plane VCN 1416 can directly communicate with, and can thereby execute the changes, updates, or other suitable modifications to configuration to, resources contained in the data plane VCN 1418.

In some embodiments, the control plane VCN 1416 and the data plane VCN 1418 can be contained in the service tenancy 1419. In this case, the user, or the customer, of the system may not own or operate either the control plane VCN 1416 or the data plane VCN 1418. Instead, the IaaS provider may own or operate the control plane VCN 1416 and the data plane VCN 1418, both of which may be contained in the service tenancy 1419. This example can enable isolation of networks that may prevent users or customers from interacting with other users', or other customers', resources. Also, this example may allow users or customers of the system to store databases privately without needing to rely on public Internet 1454, which may not have a desired level of threat prevention, for storage.

In other embodiments, the LB subnet(s) 1422 contained in the control plane VCN 1416 can be configured to receive a signal from the service gateway 1436. In this embodiment, the control plane VCN 1416 and the data plane VCN 1418 may be configured to be called by a customer of the IaaS provider without calling public Internet 1454. Customers of the IaaS provider may desire this example since database(s) that the customers use may be controlled by the IaaS provider and may be stored on the service tenancy 1419, which may be isolated from public Internet 1454.

Figure 15:
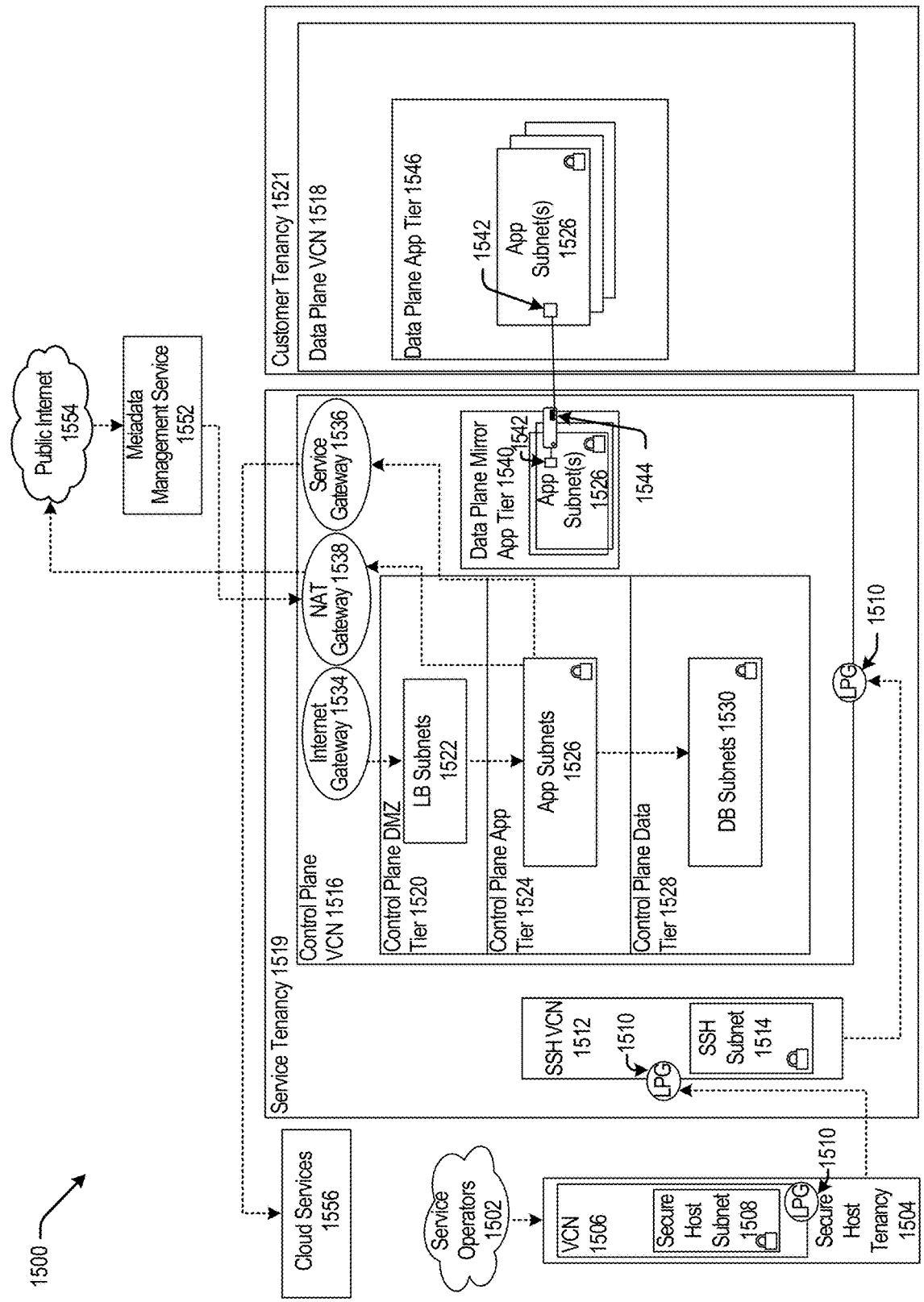
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1402 of FIG. 14) can be communicatively coupled to a secure host tenancy 1504 (e.g. the secure host tenancy 1404 of FIG. 14) that can include a virtual cloud network (VCN) 1506 (e.g. the VCN 1406 of FIG. 14) and a secure host subnet 1508 (e.g. the secure host subnet 1408 of FIG. 14). The VCN 1506 can include a local peering gateway (LPG) 1510 (e.g. the LPG 1410 of FIG. 14) that can be communicatively coupled to a secure shell (SSH) VCN 1512 (e.g. the SSH VCN 1412 of FIG. 14) via an LPG 1410 contained in the SSH VCN 1512. The SSH VCN 1512 can include an SSH subnet 1514 (e.g. the SSH subnet 1414 of FIG. 14), and the SSH VCN 1512 can be communicatively coupled to a control plane VCN 1516 (e.g. the control plane VCN 1416 of FIG. 14) via an LPG 1510 contained in the control plane VCN 1516. The control plane VCN 1516 can be contained in a service tenancy 1519 (e.g. the service tenancy 1419 of FIG. 14), and the data plane VCN 1518 (e.g. the data plane VCN 1418 of FIG. 14) can be contained in a customer tenancy 1521 that may be owned or operated by users, or customers, of the system.

The control plane VCN 1516 can include a control plane DMZ tier 1520 (e.g. the control plane DMZ tier 1420 of FIG. 14) that can include LB subnet(s) 1522 (e.g. LB subnet(s) 1422 of FIG. 14), a control plane app tier 1524 (e.g. the control plane app tier 1424 of FIG. 14) that can include app subnet(s) 1526 (e.g. app subnet(s) 1426 of FIG. 14), a control plane data tier 1528 (e.g. the control plane data tier 1428 of FIG. 14) that can include database (DB) subnet(s) 1530 (e.g. similar to DB subnet(s) 1430 of FIG. 14). The LB subnet(s) 1522 contained in the control plane DMZ tier 1520 can be communicatively coupled to the app subnet(s) 1526 contained in the control plane app tier 1524 and an Internet gateway 1534 (e.g. the Internet gateway 1434 of FIG. 14) that can be contained in the control plane VCN 1516, and the app subnet(s) 1526 can be communicatively coupled to the DB subnet(s) 1530 contained in the control plane data tier 1528 and a service gateway 1536 (e.g. the service gateway of FIG. 14) and a network address translation (NAT) gateway 1538 (e.g. the NAT gateway 1438 of FIG. 14). The control plane VCN 1516 can include the service gateway 1536 and the NAT gateway 1538.

The control plane VCN 1516 can include a data plane mirror app tier 1540 (e.g. the data plane mirror app tier 1440 of FIG. 14) that can include app subnet(s) 1526. The app subnet(s) 1526 contained in the data plane mirror app tier 1540 can include a virtual network interface controller (VNIC) 1542 (e.g. the VNIC of 1442) that can execute a compute instance 1544 (e.g. similar to the compute instance 1444 of FIG. 14). The compute instance 1544 can facilitate communication between the app subnet(s) 1526 of the data plane mirror app tier 1540 and the app subnet(s) 1526 that can be contained in a data plane app tier 1546 (e.g. the data plane app tier 1446 of FIG. 14) via the VNIC 1542 contained in the data plane mirror app tier 1540 and the VNIC 1542 contained in the data plan app tier 1546.

The Internet gateway 1534 contained in the control plane VCN 1516 can be communicatively coupled to a metadata management service 1552 (e.g. the metadata management service 1452 of FIG. 14) that can be communicatively coupled to public Internet 1554 (e.g. public Internet 1454 of FIG. 14). Public Internet 1554 can be communicatively coupled to the NAT gateway 1538 contained in the control plane VCN 1516. The service gateway 1536 contained in the control plane VCN 1516 can be communicatively couple to cloud services 1556 (e.g. cloud services 1456 of FIG. 14).

In some examples, the data plane VCN 1518 can be contained in the customer tenancy 1521. In this case, the IaaS provider may provide the control plane VCN 1516 for each customer, and the IaaS provider may, for each customer, set up a unique compute instance 1544 that is contained in the service tenancy 1519. Each compute instance 1544 may allow communication between the control plane VCN 1516, contained in the service tenancy 1519, and the data plane VCN 1518 that is contained in the customer tenancy 1521. The compute instance 1544 may allow resources, which are provisioned in the control plane VCN 1516 that is contained in the service tenancy 1519, to be deployed or otherwise used in the data plane VCN 1518 that is contained in the customer tenancy 1521.

In other examples, the customer of the IaaS provider may have databases that live in the customer tenancy 1521. In this example, the control plane VCN 1516 can include the data plane mirror app tier 1540 that can include app subnet(s) 1526. The data plane mirror app tier 1540 can reside in the data plane VCN 1518, but the data plane mirror app tier 1540 may not live in the data plane VCN 1518. That is, the data plane mirror app tier 1540 may have access to the customer tenancy 1521, but the data plane mirror app tier 1540 may not exist in the data plane VCN 1518 or be owned or operated by the customer of the IaaS provider. The data plane mirror app tier 1540 may be configured to make calls to the data plane VCN 1518 but may not be configured to make calls to any entity contained in the control plane VCN 1516. The customer may desire to deploy or otherwise use resources in the data plane VCN 1518 that are provisioned in the control plane VCN 1516, and the data plane mirror app tier 1540 can facilitate the desired deployment, or other usage of resources, of the customer.

In some embodiments, the customer of the IaaS provider can apply filters to the data plane VCN 1518. In this embodiment, the customer can determine what the data plane VCN 1518 can access, and the customer may restrict access to public Internet 1554 from the data plane VCN 1518. The IaaS provider may not be able to apply filters or otherwise control access of the data plane VCN 1518 to any outside networks or databases. Applying filters and controls by the customer onto the data plane VCN 1518, contained in the customer tenancy 1521, can help isolate the data plane VCN 1518 from other customers and from public Internet 1554.

In some embodiments, cloud services 1556 can be called by the service gateway 1536 to access services that may not exist on public Internet 1554, on the control plane VCN 1516, or on the data plane VCN 1518. The connection between cloud services 1556 and the control plane VCN 1516 or the data plane VCN 1518 may not be live or continuous. Cloud services 1556 may exist on a different network owned or operated by the IaaS provider. Cloud services 1556 may be configured to receive calls from the service gateway 1536 and may be configured to not receive calls from public Internet 1554. Some cloud services 1556 may be isolated from other cloud services 1556, and the control plane VCN 1516 may be isolated from cloud services 1556 that may not be in the same region as the control plane VCN 1516. For example, the control plane VCN 1516 may be located in "Region 1," and cloud service "Deployment 6," may be located in Region 1 and in "Region 2." If a call to Deployment 6 is made by the service gateway 1536 contained in the control plane VCN 1516 located in Region 1, the call may be transmitted to Deployment 6 in Region 1. In this example, the control plane VCN 1516, or Deployment 6 in Region 1, may not be communicatively coupled to, or otherwise in communication with, Deployment 6 in Region 2.

Figure 16:
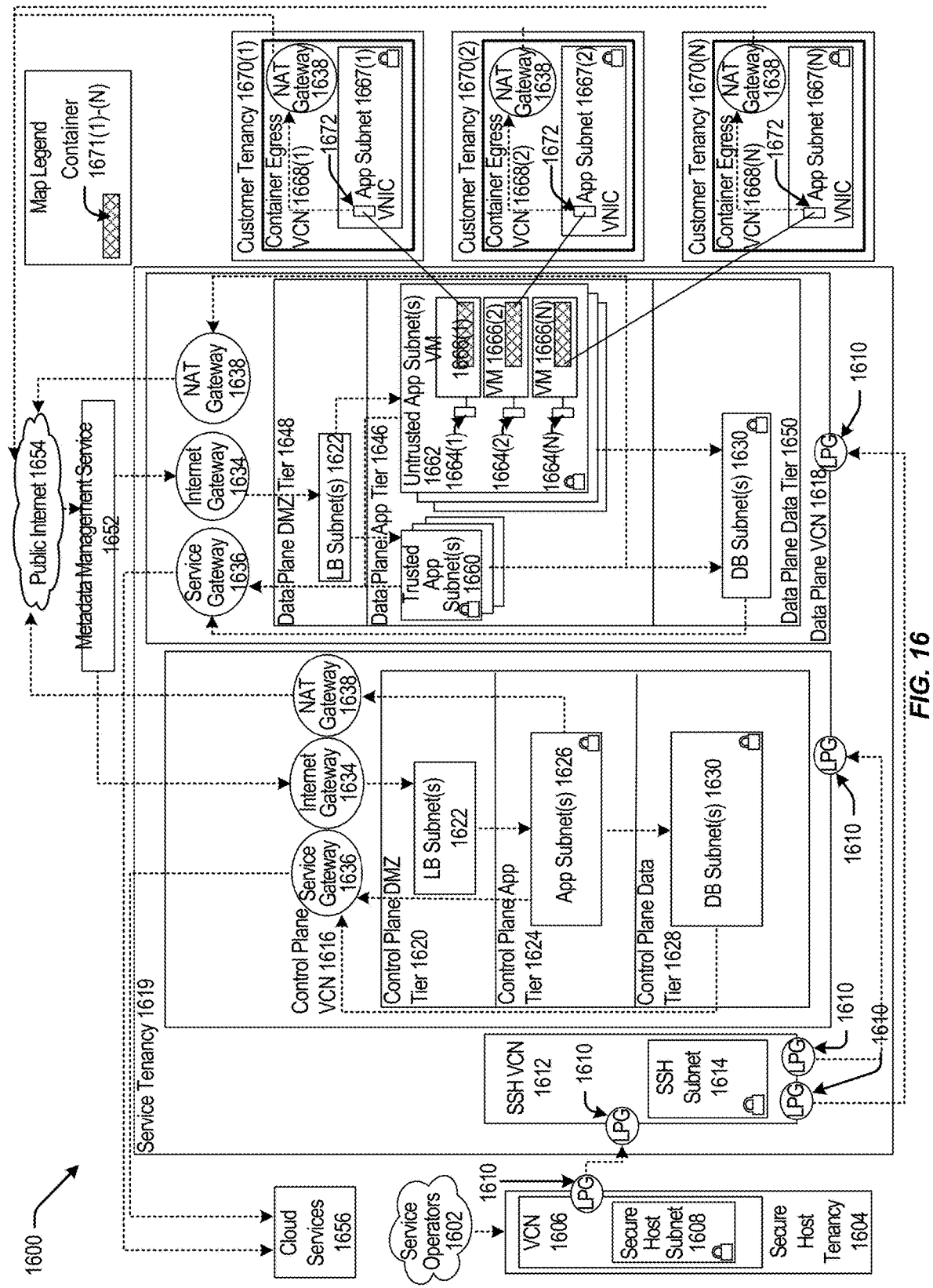
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1402 of FIG. 14) can be communicatively coupled to a secure host tenancy 1604 (e.g. the secure host tenancy 1404 of FIG. 14) that can include a virtual cloud network (VCN) 1606 (e.g. the VCN 1406 of FIG. 14) and a secure host subnet 1608 (e.g. the secure host subnet 1408 of FIG. 14). The VCN 1606 can include an LPG 1610 (e.g. the LPG 1410 of FIG. 14) that can be communicatively coupled to an SSH VCN 1612 (e.g. the SSH VCN 1412 of FIG. 14) via an LPG 1610 contained in the SSH VCN 1612. The SSH VCN 1612 can include an SSH subnet 1614 (e.g. the SSH subnet 1414 of FIG. 14), and the SSH VCN 1612 can be communicatively coupled to a control plane VCN 1616 (e.g. the control plane VCN 1416 of FIG. 14) via an LPG 1610 contained in the control plane VCN 1616 and to a data plane VCN 1618 (e.g. the data plane 1418 of FIG. 14) via an LPG 1610 contained in the data plane VCN 1618. The control plane VCN 1616 and the data plane VCN 1618 can be contained in a service tenancy 1619 (e.g. the service tenancy 1419 of FIG. 14).

The control plane VCN 1616 can include a control plane DMZ tier 1620 (e.g. the control plane DMZ tier 1420 of FIG. 14) that can include load balancer (LB) subnet(s) 1622 (e.g. LB subnet(s) 1422 of FIG. 14), a control plane app tier 1624 (e.g. the control plane app tier 1424 of FIG. 14) that can include app subnet(s) 1626 (e.g. similar to app subnet(s) 1426 of FIG. 14), a control plane data tier 1628 (e.g. the control plane data tier 1428 of FIG. 14) that can include DB subnet(s) 1630. The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1434 of FIG. 14) that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 14) and a network address translation (NAT) gateway 1638 (e.g. the NAT gateway 1438 of FIG. 14). The control plane VCN 1616 can include the service gateway 1636 and the NAT gateway 1638.

The data plane VCN 1618 can include a data plane app tier 1646 (e.g. the data plane app tier 1446 of FIG. 14), a data plane DMZ tier 1648 (e.g. the data plane DMZ tier 1448 of FIG. 14), and a data plane data tier 1650 (e.g. the data plane data tier 1450 of FIG. 14). The data plane DMZ tier 1648 can include LB subnet(s) 1622 that can be communicatively coupled to trusted app subnet(s) 1660 and untrusted app subnet(s) 1662 of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include one or more primary VNICs 1664(1)-(N) that can be communicatively coupled to tenant virtual machines (VMs) 1666(1)-(N). Each tenant VM 1666(1)-(N) can be communicatively coupled to a respective app subnet 1667(1)-(N) that can be contained in respective container egress VCNs 1668(1)-(N) that can be contained in respective customer tenancies 1670(1)-(N). Respective secondary VNICs 1672(1)-(N) can facilitate communication between the untrusted app subnet(s) 1662 contained in the data plane VCN 1618 and the app subnet contained in the container egress VCNs 1668(1)-(N). Each container egress VCNs 1668(1)-(N) can include a NAT gateway 1638 that can be communicatively coupled to public Internet 1654 (e.g. public Internet 1454 of FIG. 14).

The Internet gateway 1634 contained in the control plane VCN 1616 and contained in the data plane VCN 1618 can be communicatively coupled to a metadata management service 1652 (e.g. the metadata management system 1452 of FIG. 14) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some embodiments, the data plane VCN 1618 can be integrated with customer tenancies 1670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1646. Code to run the function may be executed in the VMs 1666(1)-(N), and the code may not be configured to run anywhere else on the data plane VCN 1618. Each VM 1666(1)-(N) may be connected to one customer tenancy 1670. Respective containers 1671(1)-(N) contained in the VMs 1666(1)-(N) may be configured to run the code. In this case, there can be a dual isolation (e.g., the containers 1671(1)-(N) running code, where the containers 1671(1)-(N) may be contained in at least the VM 1666(1)-(N) that are contained in the untrusted app subnet(s) 1662), which may help prevent incorrect or otherwise undesirable code from damaging the network of the IaaS provider or from damaging a network of a different customer. The containers 1671(1)-(N) may be communicatively coupled to the customer tenancy 1670 and may be configured to transmit or receive data from the customer tenancy 1670. The containers 1671(1)-(N) may not be configured to transmit or receive data from any other entity in the data plane VCN 1618. Upon completion of running the code, the IaaS provider may kill or otherwise dispose of the containers 1671(1)-(N).

In some embodiments, the trusted app subnet(s) 1660 may run code that may be owned or operated by the IaaS provider. In this embodiment, the trusted app subnet(s) 1660 may be communicatively coupled to the DB subnet(s) 1630 and be configured to execute CRUD operations in the DB subnet(s) 1630. The untrusted app subnet(s) 1662 may be communicatively coupled to the DB subnet(s) 1630, but in this embodiment, the untrusted app subnet(s) may be configured to execute read operations in the DB subnet(s) 1630. The containers 1671(1)-(N) that can be contained in the VM 1666(1)-(N) of each customer and that may run code from the customer may not be communicatively coupled with the DB subnet(s) 1630.

In other embodiments, the control plane VCN 1616 and the data plane VCN 1618 may not be directly communicatively coupled. In this embodiment, there may be no direct communication between the control plane VCN 1616 and the data plane VCN 1618. However, communication can occur indirectly through at least one method. An LPG 1610 may be established by the IaaS provider that can facilitate communication between the control plane VCN 1616 and the data plane VCN 1618. In another example, the control plane VCN 1616 or the data plane VCN 1618 can make a call to cloud services 1656 via the service gateway 1636. For example, a call to cloud services 1656 from the control plane VCN 1616 can include a request for a service that can communicate with the data plane VCN 1618.

Figure 17:
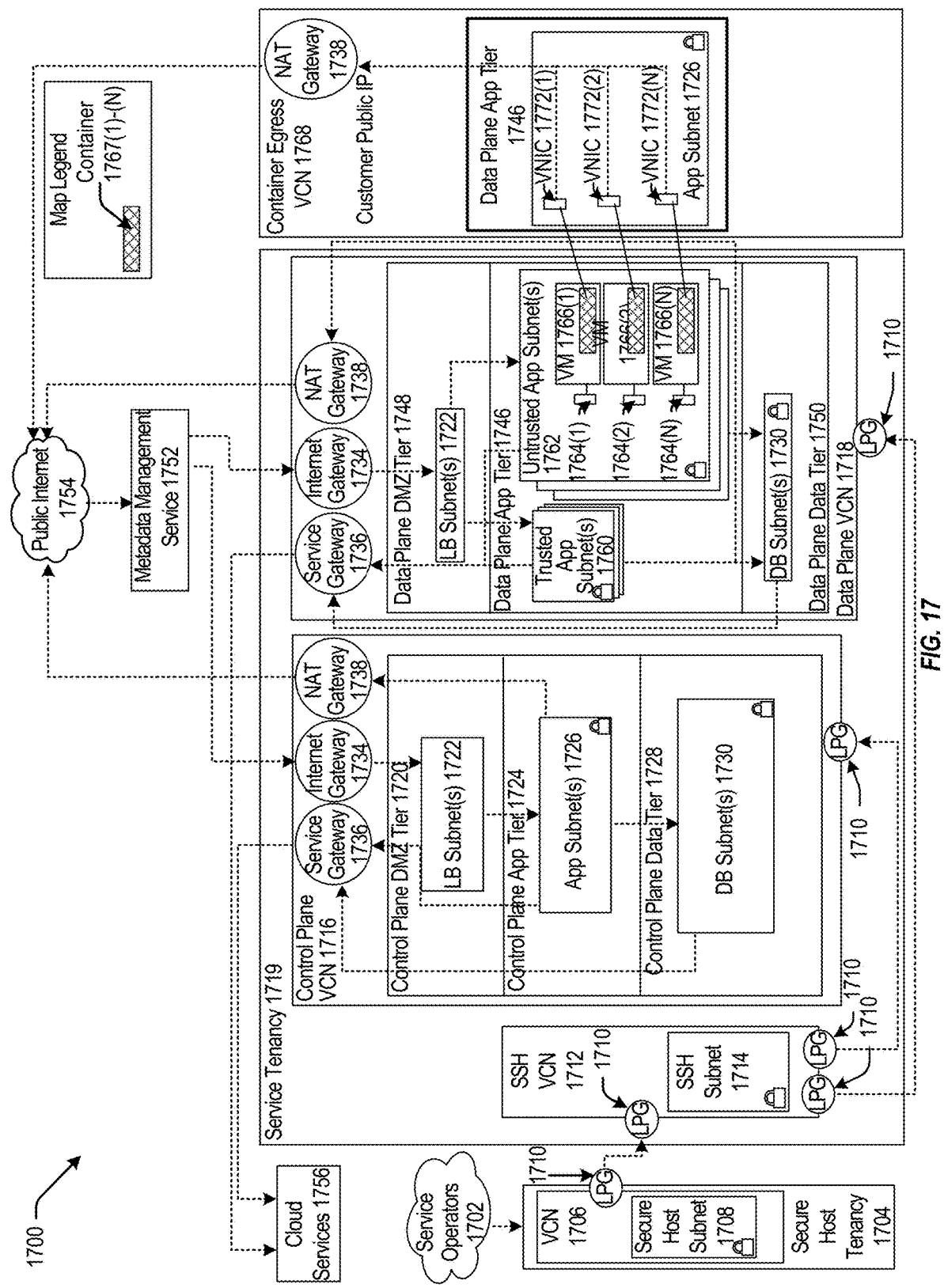
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g. service operators 1402 of FIG. 14) can be communicatively coupled to a secure host tenancy 1704 (e.g. the secure host tenancy 1404 of FIG. 14) that can include a virtual cloud network (VCN) 1706 (e.g. the VCN 1406 of FIG. 14) and a secure host subnet 1708 (e.g. the secure host subnet 1408 of FIG. 14). The VCN 1706 can include an LPG 1710 (e.g. the LPG 1410 of FIG. 14) that can be communicatively coupled to an SSH VCN 1712 (e.g. the SSH VCN 1412 of FIG. 14) via an LPG 1710 contained in the SSH VCN 1712. The SSH VCN 1712 can include an SSH subnet 1714 (e.g. the SSH subnet 1414 of FIG. 14), and the SSH VCN 1712 can be communicatively coupled to a control plane VCN 1716 (e.g. the control plane VCN 1416 of FIG. 14) via an LPG 1710 contained in the control plane VCN 1716 and to a data plane VCN 1718 (e.g. the data plane 1418 of FIG. 14) via an LPG 1710 contained in the data plane VCN 1718. The control plane VCN 1716 and the data plane VCN 1718 can be contained in a service tenancy 1719 (e.g. the service tenancy 1419 of FIG. 14).

The control plane VCN 1716 can include a control plane DMZ tier 1720 (e.g. the control plane DMZ tier 1420 of FIG. 14) that can include LB subnet(s) 1722 (e.g. LB subnet(s) 1422 of FIG. 14), a control plane app tier 1724 (e.g. the control plane app tier 1424 of FIG. 14) that can include app subnet(s) 1726 (e.g. app subnet(s) 1426 of FIG. 14), a control plane data tier 1728 (e.g. the control plane data tier 1428 of FIG. 14) that can include DB subnet(s) 1730 (e.g. DB subnet(s) 1630 of FIG. 16). The LB subnet(s) 1722 contained in the control plane DMZ tier 1720 can be communicatively coupled to the app subnet(s) 1726 contained in the control plane app tier 1724 and to an Internet gateway 1734 (e.g. the Internet gateway 1434 of FIG. 14) that can be contained in the control plane VCN 1716, and the app subnet(s) 1726 can be communicatively coupled to the DB subnet(s) 1730 contained in the control plane data tier 1728 and to a service gateway 1736 (e.g. the service gateway of FIG. 14) and a network address translation (NAT) gateway 1738 (e.g. the NAT gateway 1438 of FIG. 14). The control plane VCN 1716 can include the service gateway 1736 and the NAT gateway 1738.

The data plane VCN 1718 can include a data plane app tier 1746 (e.g. the data plane app tier 1446 of FIG. 14), a data plane DMZ tier 1748 (e.g. the data plane DMZ tier 1448 of FIG. 14), and a data plane data tier 1750 (e.g. the data plane data tier 1450 of FIG. 14). The data plane DMZ tier 1748 can include LB subnet(s) 1722 that can be communicatively coupled to trusted app subnet(s) 1760 (e.g. trusted app subnet(s) 1660 of FIG. 16) and untrusted app subnet(s) 1762 (e.g. untrusted app subnet(s) 1662 of FIG. 16) of the data plane app tier 1746 and the Internet gateway 1734 contained in the data plane VCN 1718. The trusted app subnet(s) 1760 can be communicatively coupled to the service gateway 1736 contained in the data plane VCN 1718, the NAT gateway 1738 contained in the data plane VCN 1718, and DB subnet(s) 1730 contained in the data plane data tier 1750. The untrusted app subnet(s) 1762 can be communicatively coupled to the service gateway 1736 contained in the data plane VCN 1718 and DB subnet(s) 1730 contained in the data plane data tier 1750. The data plane data tier 1750 can include DB subnet(s) 1730 that can be communicatively coupled to the service gateway 1736 contained in the data plane VCN 1718.

The untrusted app subnet(s) 1762 can include primary VNICs 1764(1)-(N) that can be communicatively coupled to tenant virtual machines (VMs) 1766(1)-(N) residing within the untrusted app subnet(s) 1762. Each tenant VM 1766(1)-(N) can run code in a respective container 1767(1)-(N), and be communicatively coupled to an app subnet 1726 that can be contained in a data plane app tier 1746 that can be contained in a container egress VCN 1768. Respective secondary VNICs 1772(1)-(N) can facilitate communication between the untrusted app subnet(s) 1762 contained in the data plane VCN 1718 and the app subnet contained in the container egress VCN 1768. The container egress VCN can include a NAT gateway 1738 that can be communicatively coupled to public Internet 1754 (e.g. public Internet 1454 of FIG. 14).

The Internet gateway 1734 contained in the control plane VCN 1716 and contained in the data plane VCN 1718 can be communicatively coupled to a metadata management service 1752 (e.g. the metadata management system 1452 of FIG. 14) that can be communicatively coupled to public Internet 1754. Public Internet 1754 can be communicatively coupled to the NAT gateway 1738 contained in the control plane VCN 1716 and contained in the data plane VCN 1718. The service gateway 1736 contained in the control plane VCN 1716 and contained in the data plane VCN 1718 can be communicatively couple to cloud services 1756.

In some examples, the pattern illustrated by the architecture of block diagram 1700 of FIG. 17 may be considered an exception to the pattern illustrated by the architecture of block diagram 1600 of FIG. 16 and may be desirable for a customer of the IaaS provider if the IaaS provider cannot directly communicate with the customer (e.g., a disconnected region). The respective containers 1767(1)-(N) that are contained in the VMs 1766(1)-(N) for each customer can be accessed in real-time by the customer. The containers 1767(1)-(N) may be configured to make calls to respective secondary VNICs 1772(1)-(N) contained in app subnet(s) 1726 of the data plane app tier 1746 that can be contained in the container egress VCN 1768. The secondary VNICs 1772(1)-(N) can transmit the calls to the NAT gateway 1738 that may transmit the calls to public Internet 1754. In this example, the containers 1767(1)-(N) that can be accessed in real-time by the customer can be isolated from the control plane VCN 1716 and can be isolated from other entities contained in the data plane VCN 1718. The containers 1767(1)-(N) may also be isolated from resources from other customers.

In other examples, the customer can use the containers 1767(1)-(N) to call cloud services 1756. In this example, the customer may run code in the containers 1767(1)-(N) that requests a service from cloud services 1756. The containers 1767(1)-(N) can transmit this request to the secondary VNICs 1772(1)-(N) that can transmit the request to the NAT gateway that can transmit the request to public Internet 1754. Public Internet 1754 can transmit the request to LB subnet(s) 1722 contained in the control plane VCN 1716 via the Internet gateway 1734. In response to determining the request is valid, the LB subnet(s) can transmit the request to app subnet(s) 1726 that can transmit the request to cloud services 1756 via the service gateway 1736.

It should be appreciated that IaaS architectures 1400, 1500, 1600, 1700 depicted in the figures may have other components than those depicted. Further, the embodiments shown in the figures are only some examples of a cloud infrastructure system that may incorporate an example of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 18:
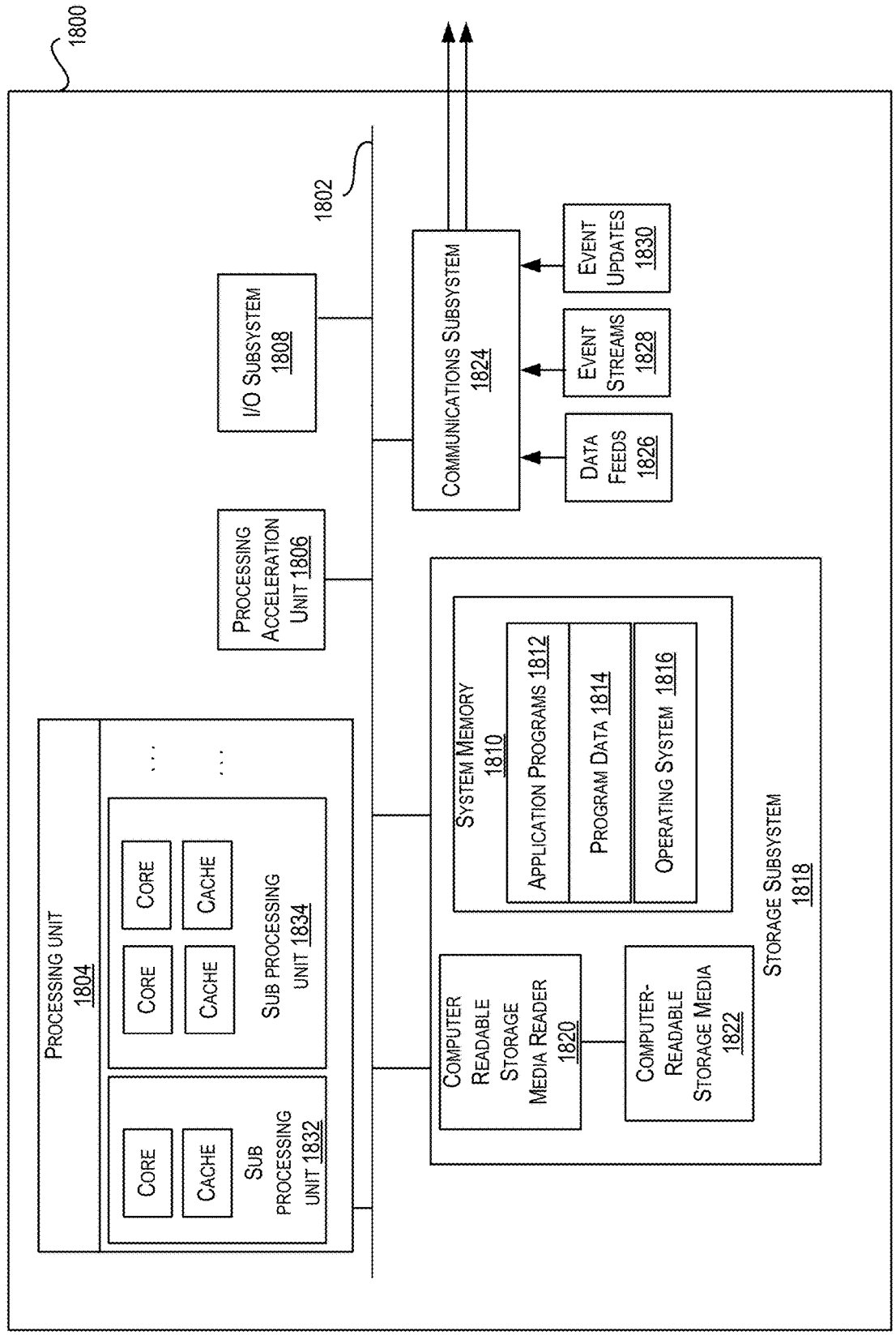
FIG. 18 is a block diagram illustrating an example computer system, according to at least one embodiment.

FIG. 18 illustrates an example computer system 1800, in which various examples of the present disclosure may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an input/output (I/O) subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the Institute of Electrical and Electronics Engineers (IEEE) P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various examples, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as musical instrument digital interface (MIDI) keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that comprises software elements, shown as being currently located within a system memory 1810. System memory 1810 may store program instructions that are loadable and executable on processing unit 1804, as well as data generated during the execution of these programs.

Depending on the configuration and type of computer system 1800, system memory 1810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 may include multiple different types of memory, such as static random access memory (SRAM) or dynamic random access memory (DRAM). In some implementations, a basic input/output system (BIOS), containing the basic routines that help to transfer information between elements within computer system 1800, such as during start-up, may typically be stored in the ROM. By way of example, and not limitation, system memory 1810 also illustrates application programs 1812, which may include client applications, Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1818 may also provide a tangible computer-readable storage medium for storing the basic programming and data constructs that provide the functionality of some embodiments. Software (programs, code modules, instructions) that when executed by a processor provide the functionality described above may be stored in storage subsystem 1818. These software modules or instructions may be executed by processing unit 1804. Storage subsystem 1818 may also provide a repository for storing data used in accordance with the present disclosure.

Storage subsystem 1800 may also include a computer-readable storage media reader 1820 that can further be connected to computer-readable storage media 1822.

Together and, optionally, in combination with system memory 1810, computer-readable storage media 1822 may comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact disc read only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various examples.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an example of the present disclosure may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The specific details of particular embodiments may be combined in any suitable manner or varied from those shown and described herein without departing from the spirit and scope of embodiments of the disclosure.

The above description of exemplary embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various examples and with various modifications as are suited to the particular use contemplated.

All publications, patents, and patent applications cited herein are hereby incorporated by reference in their entirety for all purposes.

What is claimed is:

1. A method, comprising:
receiving, by a computing device, a selection of one or more contact center features, the contact center features associated with one or more micro services configured to execute the one or more contact center features;
selecting, by the computing device, a contact center model from a plurality of stored contact center models, the contact center model associating the one or more micro services for a contact center, the selecting being based at least in part on the selection of the one or more contact center features, the selected contact center model comprising programmable code configured to execute the one or more micro services;

provisioning, by the computing device, the selected contact center model to execute the one or more micro services;

generating, by the computing device, executable code from the provisioned contact center model using an automation server;

deploying, by the computing device, the executable code to one or more servers for execution by the one or more servers; and integrating the executable code associated with the one or more micro services comprising:
providing one or more representational state transfer (REST) application programming interfaces (APIs) to vendor contact software application.

2. The method of claim 1, further comprising receiving one or more inputs for a customized flow that provides an order for executing the one or more contact center features.

3. The method of claim 2, wherein the one or more micro services comprise respective web services.

4. The method of claim 1, further comprising testing an ability of the selected contact center model to execute the one or more micro services.

5. The method of claim 1, wherein at least some of the contact center features comprise different contact center feature versions from other contact center features.

6. The method of claim 1, wherein each of the one or more contact center features comprises a front-end component and a back end component, wherein the front- end component uses a markup language that is both human-readable and machine-readable.

7. The method of claim 6, wherein the back end component uses an object-oriented programming language.

8. A non-transitory computer-readable medium storing a set of instructions, the set of instructions comprising:
one or more instructions that, when executed by one or more processors of a computing device, cause the computing device to perform operations comprising:
receive a selection of one or more contact center features, the contact center features associated with one or more micro services configured to execute the one or more contact center features;
select a contact center model from a plurality of stored contact center models, the contact center model associating the one or more micro services for a contact center, the selecting being based at least in part on the selection of the one or more contact center features, the selected contact center model comprising programmable code configured to execute the one or more micro services;
provision the selected contact center model to execute the one or more micro services; and
generate executable code from the provisioned contact center model using an automation server for deployment to one or more servers; and
integrate the executable code associated with the one or more micro services comprising:
provide one or more representational state transfer (REST) application programming interfaces (APIs) to vendor contact software application.

9. The non-transitory computer-readable medium of claim 8, wherein the one or more instructions further cause the computing device to receive one or more inputs for a customized flow that provides an order for executing the one or more contact center features.

10. The non-transitory computer-readable medium of claim 9, wherein the one or more micro services comprise respective web services.

11. The non-transitory computer-readable medium of claim 8, wherein the one or more instructions further cause the computing device to test an ability of the selected contact center model to execute the one or more micro services.

12. The non-transitory computer-readable medium of claim 8, wherein at least some of the contact center features comprise different contact center features versions from the other contact center features.

13. The non-transitory computer-readable medium of claim 8, wherein each of the one or more contact center features comprises a front-end component and a back end component, wherein the front-end component uses a markup language that is both human-readable and machine-readable.

14. The non-transitory computer-readable medium of claim 13, wherein the back end component uses an object-oriented programming language.

15. A computing device, comprising:
one or more memories; and
one or more processors, communicatively coupled to the one or more memories, configured to perform operations comprising:
receive a selection of one or more contact center features, the contact center features associated with one or more micro services configured to execute the one or more contact center features;
select a contact center model from a plurality of stored contact center models, the contact center model associating the one or more micro services for a contact center, the selecting being based at least in part on the selection of the one or more contact center features, the selected contact center model comprising programmable code configured to execute the one or more micro services;
provision the selected contact center model to execute the one or more micro services; and
generate executable code from the provisioned contact center model using an automation server for deployment to one or more servers; and
integrate the executable code associated with the one or more micro services comprising:
provide one or more representational state transfer (REST) application programming interfaces (APIs) to vendor contact software application.

16. The computing device of claim 15, wherein the one or more processors are further configured to receive one or more inputs for a customized flow that provides an order for executing the one or more contact center features.

17. The computing device of claim 16, wherein the one or more micro services comprise respective web services.

18. The computing device of claim 15, wherein the one or more processors are further configured to test an ability of the selected contact center model to execute the one or more micro services.

19. The computing device of claim 15, wherein at least some of the contact center features comprise different contact center features versions from the other contact center features.

20. The computing device of claim 15, wherein each of the one or more contact center features comprises a front-end component and a back end component, wherein the front end component uses a markup language that is both human-readable and machine-readable.

* * * * *

UNITED STATES PATENT AND TRADEMARK OFFICE
CERTIFICATE OF CORRECTION

PATENT NO. : 11,567,740 B2
APPLICATION NO. : 17/174234
DATED : January 31, 2023
INVENTOR(S) : Statham et al.

It is certified that error appears in the above-identified patent and that said Letters Patent is hereby corrected as shown below:

In the Specification

In Column 4, Line 4, after "optimizing a" insert -- contact service center --.

In Column 7, Lines 37-38, delete "The menu feature 312 can allow a client to customize".

In Column 8, Lines 25-26, delete "The one or more features can be provisioned for".

In Column 11, Line 53, delete "SonarCube)" and insert -- SonarQube) --, therefor.

In Column 15, Line 13, delete "1824" and insert -- 1824. --, therefor.

In Column 17, Line 3, delete "like" and insert -- like). --, therefor.

In the Claims

In Column 33, Line 33, in Claim 6, delete "front- end" and insert -- front-end --, therefor.

Signed and Sealed this
Nineteenth Day of December, 2023

Katherine Kelly Vidal
*Director of the United States Patent and Trademark Office*